United States Patent
Ng et al.

[11] Patent Number: 6,021,256
[45] Date of Patent: Feb. 1, 2000

[54] RESOLUTION ENHANCEMENT SYSTEM FOR DIGITAL IMAGES

[75] Inventors: Yee Seung Ng; Glenn Robert Van Lare, both of Fairport; Richard Thomas Fischer, Rochester, all of N.Y.

[73] Assignee: Eastman Kodak Company, Rochester, N.Y.

[21] Appl. No.: 08/706,953

[22] Filed: Sep. 3, 1996

[51] Int. Cl.[7] ............................... G06T 5/00; H04N 1/409
[52] U.S. Cl. ........................ 395/109; 382/266; 382/299; 358/442
[58] Field of Search ..................... 382/266, 269, 382/254, 299; 395/102, 109; 358/447, 455, 462

[56] References Cited

U.S. PATENT DOCUMENTS

| | | |
|---|---|---|
| 4,746,941 | 5/1988 | Pham et al. . |
| 4,750,010 | 6/1988 | Ayers et al. . |
| 4,882,686 | 11/1989 | Gretter . |
| 5,005,139 | 4/1991 | Tung . |
| 5,300,960 | 4/1994 | Pham et al. . |
| 5,450,531 | 9/1995 | Ng et al. ............................ 382/269 |
| 5,483,605 | 1/1996 | Rostamian ......................... 382/209 |
| 5,502,793 | 3/1996 | Ng .................................... 395/109 |
| 5,687,297 | 11/1997 | Coonan et al. ..................... 395/102 |

OTHER PUBLICATIONS

"Image Makers" by Henry Bortman MacUser, Nov. 1991, pp. 98–103.

Primary Examiner—Scott Rogers
Attorney, Agent, or Firm—Norman Rushefsky

[57] ABSTRACT

An image processing system for providing edge enhancement of low resolution binary image files processes the low resolution data in sections or windows using a binary edge enhancement processor unit to determine whether an edge transition or "kink site" occurs within each window. The edge enhancement processor includes a decision matrix that identifies a pixel based on a calculated gradient magnitude and direction. In one operating mode, the original data in the window is replaced with edge enhanced gray-scale data stored in a look-up table if a kink site is identified. In a second operating mode original data is replaced with higher resolution binary data. To improve speed of operation of the processor, a set of criteria used for determining where enhancement pixels are to be generated has logic operators used for processing the criteria operated simultaneously with a bias provided favoring determinations having closer proximity towards a site likely to require image enhancements. In addition a raster line of pixels is separated into segments and each segment operated on in parallel.

40 Claims, 39 Drawing Sheets

FIG. 2

| FIG. 2A | FIG. 2B |
|---|---|
| FIG. 2C | FIG. 2D |

| | | | | | | | | |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 255 | 255 | 255 | 255 | 255 | 255 | 255 | 255 | 255 |
| 255 | 255 | 255 | 255 | 255 | 255 | 255 | 255 | 255 |
| 255 | 255 | 255 | 0 | 0 | 0 | 0 | 0 | 255 |
| 255 | 255 | 0 | 0 | 0 | 0 | 0 | 0 | 0 |
| 255 | 255 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 255 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 255 |
| 0 | 0 | 0 | 0 | 0 | 255 | 255 | 255 | 255 |
| 255 | 255 | 255 | 255 | 255 | 255 | 255 | 255 | 255 |
| 255 | 255 | 255 | 255 | 255 | 255 | 255 | 255 | 0 |
| 0 | 0 | 0 | 255 | 255 | 255 | 255 | 255 | 0 |

FIG. 2A

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 255 | 255 | 0 | 0 | 0 | 0 | 0 | 0 | 0 | 0 |
| 255 | 255 | 255 | 255 | 0 | 0 | 0 | 0 | 0 | 0 |
| 255 | 255 | 255 | 255 | 255 | 0 | 0 | 0 | 0 | 0 |
| 0 | 255 | 255 | 255 | 255 | 255 | 0 | 0 | 0 | 0 |
| 0 | 255 | 255 | 255 | 255 | 255 | 0 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 0 | 255 | 255 | 255 | 255 | 255 | 0 | 0 | 0 |
| 0 | 255 | 255 | 255 | 255 | 255 | 0 | 0 | 0 | 0 |
| 0 | 255 | 255 | 255 | 255 | 255 | 0 | 0 | 0 | 0 |
| 255 | 255 | 255 | 255 | 255 | 0 | 0 | 0 | 0 | 0 |
| 255 | 255 | 255 | 255 | 0 | 0 | 0 | 0 | 0 | 0 |
| 255 | 255 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 2B

| 0 | 0 | 0 | 255 | 255 | 255 | 255 | 255 | 0 |
|---|---|---|---|---|---|---|---|---|
| 0 | 0 | 0 | 255 | 255 | 255 | 255 | 255 | 255 |
| 0 | 0 | 0 | 0 | 255 | 255 | 255 | 255 | 255 |
| 0 | 0 | 0 | 0 | 255 | 255 | 255 | 255 | 255 |
| 0 | 0 | 0 | 0 | 255 | 255 | 255 | 255 | 255 |
| 0 | 0 | 0 | 0 | 0 | 255 | 255 | 255 | 255 |
| 0 | 0 | 0 | 0 | 0 | 255 | 255 | 255 | 255 |
| 0 | 0 | 0 | 0 | 0 | 0 | 255 | 255 | 255 |
| 0 | 0 | 0 | 0 | 0 | 0 | 255 | 255 | 255 |
| 0 | 0 | 0 | 0 | 0 | 0 | 255 | 255 | 255 |
| 0 | 0 | 0 | 0 | 0 | 0 | 0 | 255 | 255 |
| 0 | 0 | 0 | 0 | 0 | 0 | 0 | 255 | 255 |
| 0 | 0 | 0 | 0 | 0 | 0 | 0 | 255 | 255 |
| 0 | 0 | 0 | 0 | 0 | 0 | 0 | 0 | 255 |
| 0 | 0 | 0 | 0 | 0 | 0 | 0 | 0 | 255 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 2C

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 255 | 0 | 0 | 0 | 0 | 0 | 0 | 0 | 0 | 0 |
| 255 | 0 | 0 | 0 | 0 | 0 | 0 | 0 | 0 | 0 |
| 255 | 0 | 0 | 0 | 0 | 0 | 0 | 0 | 0 | 0 |
| 255 | 255 | 0 | 0 | 0 | 0 | 0 | 0 | 0 | 0 |
| 255 | 255 | 0 | 0 | 0 | 0 | 0 | 0 | 0 | 0 |
| 255 | 255 | 255 | 0 | 0 | 0 | 0 | 0 | 0 | 0 |
| 255 | 255 | 255 | 0 | 0 | 0 | 0 | 0 | 0 | 0 |
| 255 | 255 | 255 | 0 | 0 | 0 | 0 | 0 | 0 | 0 |
| 255 | 255 | 255 | 255 | 0 | 0 | 0 | 0 | 0 | 0 |
| 255 | 255 | 255 | 255 | 255 | 0 | 0 | 0 | 0 | 0 |
| 255 | 255 | 255 | 255 | 255 | 255 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 2D

|     |     |     |     |     |     |     |     |     |
| --- | --- | --- | --- | --- | --- | --- | --- | --- |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 806 | 1020 | 1020 | 1020 | 1020 | 1020 | 1020 | 1020 | 1020 |
| 1062 | 1020 | 1020 | 1020 | 1020 | 1020 | 1020 | 1020 | 1020 |
| 1020 | 0 | 361 | 806 | 1020 | 1020 | 1020 | 806 | 361 |
| 1020 | 361 | 1062 | 1140 | 1020 | 1020 | 1020 | 1140 | 1140 |
| 1020 | 806 | 1140 | 361 | 0 | 0 | 0 | 361 | 806 |
| 806 | 1140 | 806 | 0 | 0 | 0 | 0 | 0 | 0 |
| 361 | 1140 | 361 | 0 | 0 | 0 | 0 | 0 | 0 |
| 0 | 1020 | 0 | 0 | 0 | 0 | 0 | 0 | 0 |
| 0 | 1020 | 0 | 0 | 0 | 0 | 0 | 0 | 0 |
| 510 | 806 | 0 | 0 | 0 | 0 | 0 | 0 | 0 |
| 510 | 361 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 361 |
| 0 | 0 | 0 | 0 | 0 | 0 | 0 | 361 | 1062 |
| 0 | 0 | 0 | 0 | 361 | 806 | 1020 | 1140 | 1062 |
| 806 | 1020 | 1020 | 1020 | 1140 | 1140 | 1020 | 806 | 0 |
| 1062 | 1020 | 1020 | 1020 | 806 | 361 | 0 | 361 | 1062 |
| 1062 | 1020 | 806 | 361 | 0 | 0 | 0 | 806 | 1140 |
| 806 | 1020 | 1062 | 806 | 0 | 0 | 0 | 1020 | 1020 |

FIG. 3A

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1020 | 806 | 361 | 0 | 0 | 0 | 0 | 0 | 0 | 0 |
| 1020 | 1140 | 1140 | 806 | 361 | 0 | 0 | 0 | 0 | 0 |
| 0 | 361 | 806 | 1140 | 1062 | 361 | 0 | 0 | 0 | 0 |
| 806 | 361 | 0 | 361 | 1062 | 1062 | 361 | 0 | 0 | 0 |
| 1020 | 806 | 0 | 0 | 361 | 1140 | 806 | 0 | 0 | 0 |
| 806 | 1140 | 361 | 0 | 0 | 806 | 1140 | 361 | 0 | 0 |
| 361 | 1140 | 806 | 0 | 0 | 361 | 1140 | 806 | 0 | 0 |
| 0 | 1020 | 1020 | 0 | 0 | 0 | 1020 | 1020 | 0 | 0 |
| 0 | 1020 | 1020 | 0 | 0 | 0 | 1020 | 1020 | 0 | 0 |
| 0 | 1020 | 1020 | 0 | 0 | 0 | 1020 | 1020 | 0 | 0 |
| 361 | 1140 | 806 | 0 | 0 | 361 | 1140 | 806 | 0 | 0 |
| 806 | 1140 | 361 | 0 | 0 | 806 | 1140 | 361 | 0 | 0 |
| 1140 | 806 | 0 | 0 | 361 | 1140 | 806 | 0 | 0 | 0 |
| 1062 | 361 | 0 | 361 | 1062 | 1062 | 361 | 0 | 0 | 0 |
| 361 | 361 | 806 | 1140 | 1062 | 361 | 0 | 0 | 0 | 0 |
| 806 | 1140 | 1140 | 806 | 361 | 0 | 0 | 0 | 0 | 0 |
| 1140 | 806 | 361 | 0 | 0 | 0 | 0 | 0 | 0 | 0 |
| 361 | 0 | 0 | 0 | 0 | 0 | 0 | 0 | 0 | 0 |
| 0 | 0 | 0 | 0 | 0 | 0 | 0 | 0 | 0 | 0 |

FIG. 3B

| 0 | 0 | 1020 | 1020 | 0 | 0 | 0 | 806 | 1140 |
|---|---|---|---|---|---|---|---|---|
| 0 | 0 | 806 | 1140 | 361 | 0 | 0 | 361 | 1140 |
| 0 | 0 | 361 | 1140 | 806 | 0 | 0 | 0 | 1020 |
| 0 | 0 | 0 | 1020 | 1020 | 0 | 0 | 0 | 806 |
| 0 | 0 | 0 | 806 | 1140 | 361 | 0 | 0 | 361 |
| 0 | 0 | 0 | 361 | 1140 | 806 | 0 | 0 | 0 |
| 0 | 0 | 0 | 0 | 806 | 1140 | 361 | 0 | 0 |
| 0 | 0 | 0 | 0 | 361 | 1140 | 806 | 0 | 0 |
| 0 | 0 | 0 | 0 | 0 | 1020 | 1020 | 0 | 0 |
| 0 | 0 | 0 | 0 | 0 | 806 | 1140 | 361 | 0 |
| 0 | 0 | 0 | 0 | 0 | 361 | 1140 | 806 | 0 |
| 0 | 0 | 0 | 0 | 0 | 0 | 1020 | 1020 | 0 |
| 0 | 0 | 0 | 0 | 0 | 0 | 806 | 1140 | 361 |
| 0 | 0 | 0 | 0 | 0 | 0 | 361 | 1140 | 806 |
| 0 | 0 | 0 | 0 | 0 | 0 | 0 | 806 | 1020 |
| 0 | 0 | 0 | 0 | 0 | 0 | 0 | 361 | 806 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 3C

| 361 | 0 | 0 | 0 | 0 | 0 | 0 | 0 | 0 | 0 |
|---|---|---|---|---|---|---|---|---|---|
| 806 | 0 | 0 | 0 | 0 | 0 | 0 | 0 | 0 | 0 |
| 1020 | 0 | 0 | 0 | 0 | 0 | 0 | 0 | 0 | 0 |
| 1140 | 361 | 0 | 0 | 0 | 0 | 0 | 0 | 0 | 0 |
| 1140 | 806 | 0 | 0 | 0 | 0 | 0 | 0 | 0 | 0 |
| 1020 | 1020 | 0 | 0 | 0 | 0 | 0 | 0 | 0 | 0 |
| 806 | 1140 | 361 | 0 | 0 | 0 | 0 | 0 | 0 | 0 |
| 361 | 1140 | 806 | 0 | 0 | 0 | 0 | 0 | 0 | 0 |
| 0 | 806 | 1140 | 361 | 0 | 0 | 0 | 0 | 0 | 0 |
| 0 | 361 | 1140 | 806 | 0 | 0 | 0 | 0 | 0 | 0 |
| 0 | 0 | 1020 | 1020 | 0 | 0 | 0 | 0 | 0 | 0 |
| 0 | 0 | 806 | 1140 | 361 | 0 | 0 | 0 | 0 | 0 |
| 0 | 0 | 361 | 1062 | 1062 | 361 | 0 | 0 | 0 | 0 |
| 0 | 0 | 0 | 361 | 1062 | 1062 | 361 | 0 | 0 | 0 |
| 1020 | 1020 | 1020 | 1020 | 806 | 806 | 510 | 0 | 0 | 0 |
| 1020 | 1020 | 1020 | 1020 | 1020 | 806 | 361 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 3D

|   |   |
|---|---|
| FIG. 4A | FIG. 4B |
| FIG. 4C | FIG. 4D |

FIG. 4

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 252 | 270 | 270 | 270 | 270 | 270 | 270 | 270 | 270 |
| 225 | 270 | 270 | 270 | 270 | 270 | 270 | 270 | 270 |
| 180 | 0 | 45 | 72 | 90 | 90 | 90 | 106 | 135 |
| 180 | 45 | 45 | 63 | 90 | 90 | 90 | 117 | 117 |
| 180 | 18 | 27 | 45 | 0 | 0 | 0 | 135 | 106 |
| 162 | 27 | 18 | 0 | 0 | 0 | 0 | 0 | 0 |
| 135 | 27 | 45 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 90 | 18 | 0 | 0 | 0 | 0 | 0 | 0 | 0 |
| 90 | 45 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 225 |
| 0 | 0 | 0 | 0 | 0 | 0 | 0 | 225 | 225 |
| 0 | 0 | 0 | 0 | 225 | 252 | 270 | 243 | 225 |
| 252 | 270 | 270 | 270 | 243 | 243 | 270 | 252 | 0 |
| 225 | 270 | 270 | 270 | 252 | 225 | 0 | 45 | 45 |
| 135 | 90 | 106 | 135 | 0 | 0 | 0 | 18 | 27 |
| 106 | 90 | 135 | 162 | 0 | 0 | 0 | 0 | 0 |

FIG. 4A

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 270 | 265 | 315 | 0 | 0 | 0 | 0 | 0 | 0 | 0 |
| 270 | 297 | 297 | 268 | 315 | 0 | 0 | 0 | 0 | 0 |
| 0 | 316 | 266 | 297 | 315 | 315 | 0 | 0 | 0 | 0 |
| 106 | 135 | 0 | 315 | 315 | 315 | 315 | 0 | 0 | 0 |
| 136 | 162 | 0 | 0 | 315 | 333 | 342 | 0 | 0 | 0 |
| 162 | 153 | 135 | 0 | 0 | 342 | 333 | 315 | 0 | 0 |
| 135 | 153 | 162 | 0 | 0 | 315 | 333 | 342 | 0 | 0 |
| 0 | 180 | 180 | 0 | 0 | 0 | 0 | 0 | 0 | 0 |
| 0 | 180 | 180 | 0 | 0 | 0 | 0 | 0 | 0 | 0 |
| 0 | 180 | 180 | 0 | 0 | 0 | 0 | 0 | 0 | 0 |
| 225 | 207 | 196 | 0 | 0 | 45 | 27 | 16 | 0 | 0 |
| 196 | 207 | 225 | 0 | 0 | 16 | 27 | 45 | 0 | 0 |
| 207 | 196 | 0 | 0 | 45 | 27 | 16 | 0 | 0 | 0 |
| 225 | 225 | 0 | 45 | 45 | 45 | 45 | 0 | 0 | 0 |
| 225 | 45 | 72 | 63 | 45 | 45 | 0 | 0 | 0 | 0 |
| 72 | 63 | 63 | 72 | 45 | 0 | 0 | 0 | 0 | 0 |
| 63 | 72 | 45 | 0 | 0 | 0 | 0 | 0 | 0 | 0 |
| 45 | 0 | 0 | 0 | 0 | 0 | 0 | 0 | 0 | 0 |
| 0 | 0 | 0 | 0 | 0 | 0 | 0 | 0 | 0 | 0 |

FIG. 4B

| | | | | | | | | |
|---|---|---|---|---|---|---|---|---|
| 0 | 0 | 180 | 180 | 0 | 0 | 0 | 342 | 333 |
| 0 | 0 | 162 | 153 | 135 | 0 | 0 | 315 | 333 |
| 0 | 0 | 135 | 153 | 162 | 0 | 0 | 0 | 0 |
| 0 | 0 | 0 | 180 | 180 | 0 | 0 | 0 | 342 |
| 0 | 0 | 0 | 162 | 153 | 135 | 0 | 0 | 315 |
| 0 | 0 | 0 | 135 | 153 | 162 | 0 | 0 | 0 |
| 0 | 0 | 0 | 0 | 162 | 153 | 135 | 0 | 0 |
| 0 | 0 | 0 | 0 | 135 | 153 | 162 | 0 | 0 |
| 0 | 0 | 0 | 0 | 0 | 180 | 180 | 0 | 0 |
| 0 | 0 | 0 | 0 | 0 | 162 | 153 | 135 | 0 |
| 0 | 0 | 0 | 0 | 0 | 135 | 153 | 162 | 0 |
| 0 | 0 | 0 | 0 | 0 | 0 | 180 | 180 | 0 |
| 0 | 0 | 0 | 0 | 0 | 0 | 162 | 153 | 135 |
| 0 | 0 | 0 | 0 | 0 | 0 | 135 | 153 | 162 |
| 0 | 0 | 0 | 0 | 0 | 0 | 0 | 162 | 135 |
| 0 | 0 | 0 | 0 | 0 | 0 | 0 | 135 | 106 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 4C

| 315 | 0 | 0 | 0 | 0 | 0 | 0 | 0 | 0 | 0 |
|---|---|---|---|---|---|---|---|---|---|
| 342 | 0 | 0 | 0 | 0 | 0 | 0 | 0 | 0 | 0 |
| 0 | 0 | 0 | 0 | 0 | 0 | 0 | 0 | 0 | 0 |
| 333 | 315 | 0 | 0 | 0 | 0 | 0 | 0 | 0 | 0 |
| 333 | 342 | 0 | 0 | 0 | 0 | 0 | 0 | 0 | 0 |
| 0 | 0 | 0 | 0 | 0 | 0 | 0 | 0 | 0 | 0 |
| 342 | 333 | 315 | 0 | 0 | 0 | 0 | 0 | 0 | 0 |
| 315 | 333 | 342 | 0 | 0 | 0 | 0 | 0 | 0 | 0 |
| 0 | 342 | 333 | 315 | 0 | 0 | 0 | 0 | 0 | 0 |
| 0 | 315 | 333 | 342 | 0 | 0 | 0 | 0 | 0 | 0 |
| 0 | 0 | 0 | 0 | 0 | 0 | 0 | 0 | 0 | 0 |
| 0 | 0 | 342 | 333 | 315 | 0 | 0 | 0 | 0 | 0 |
| 0 | 0 | 315 | 315 | 315 | 315 | 0 | 0 | 0 | 0 |
| 0 | 0 | 0 | 315 | 315 | 315 | 315 | 0 | 0 | 0 |
| 90 | 90 | 90 | 90 | 72 | 16 | 0 | 0 | 0 | 0 |
| 90 | 90 | 90 | 90 | 90 | 72 | 45 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

| 15 | 15 | 0 |
|----|----|---|
| 15 | 15 | 0 |
| 15 | 15 | 0 |
| 15 | 15 | 0 |
| 15 | 0  | 0 |

FIG. 13

| 0 | 5 | 6 |
|---|---|---|
| 0 | 5 | 5 |
| 0 | 5 | 5 |
| 6 | 6 | 5 |
| 5 | 6 | 6 |

FIG. 14

| 0  | 47 | 67 |
|----|----|----|
| 0  | 60 | 60 |
| 0  | 60 | 60 |
| 21 | 67 | 47 |
| 47 | 67 | 21 |

FIG. 15

| 0 | 15 | 15 |
|---|----|----|
| 0 | 15 | 15 |
| 0 | 15 | 15 |
| 0 | 15 | 15 |
| 0 | 0  | 15 |

FIG. 16

| 6 | 5 | 0 |
|---|---|---|
| 5 | 5 | 0 |
| 5 | 5 | 0 |
| 5 | 6 | 6 |
| 6 | 6 | 5 |

FIG. 17

| 67 | 47 | 0  |
|----|----|----|
| 60 | 60 | 0  |
| 60 | 60 | 0  |
| 47 | 67 | 21 |
| 27 | 67 | 47 |

FIG. 18

| 0 | 15 | 15 |
|---|----|----|
| 0 | 15 | 15 |
| 0 | 15 | 15 |
| 0 | 15 | 15 |
| 0 | 0  | 15 |

FIG. 19

| 2 | 3 | 0 |
|---|---|---|
| 3 | 3 | 0 |
| 3 | 3 | 0 |
| 3 | 2 | 2 |
| 2 | 2 | 3 |

FIG. 20

| 67 | 47 | 0  |
|----|----|----|
| 60 | 60 | 0  |
| 60 | 60 | 0  |
| 47 | 67 | 21 |
| 21 | 67 | 47 |

FIG. 21

| 0 | 0  | 15 |
|---|----|----|
| 0 | 15 | 15 |
| 0 | 15 | 15 |
| 0 | 15 | 15 |
| 0 | 15 | 15 |

| | | V41 | V21 | V11 | V31 | V51 | | |
|---|---|---|---|---|---|---|---|---|
| | | | V22 | V12 | V32 | | | |
| | | | V23 | V13 | V33 | | | |
| | | V44 | V24 | V14 | V34 | V54 | | |
| | | V45 | V25 | V15 | V35 | V55 | | |
| | | V46 | V26 | V16 | V36 | V56 | | |
| | | | V27 | V17 | V37 | | | |
| | | | V28 | V18 | V38 | | | |
| | | V49 | V29 | V19 | V39 | V59 | | |

FIG. 22

| | | | | | | | | |
|---|---|---|---|---|---|---|---|---|
| | | | | | | | | |
| | | | | | | | | |
| | | | | d14 | | | | |
| | | | d25 | d15 | d35 | | | |
| | | | | d16 | | | | |
| | | | | | | | | |
| | | | | | | | | |
| | | | | | | | | |

FIG. 23

| | | | | | | | | |
|---|---|---|---|---|---|---|---|---|
| | | | | | | | | |
| | | | | | | | | |
| | | | | a14 | | | | |
| | | | | a15 | | | | |
| | | | | a16 | | | | |
| | | | | | | | | |
| | | | | | | | | |
| | | | | | | | | |

FIG. 24

|   |   |   |   |     |     | V23 |     |   |
|---|---|---|---|-----|-----|-----|-----|---|
|   |   |   |   | V44 | V24 | V13 | V33 |   |
|   |   |   | V45 | V25 | V14 | V34 |     |   |
|   |   | V46 | V26 | V15 | V35 | V54 |     |   |
|   | V27 | V16 | V36 | V55 |     |     |     |   |
|   | V17 | V37 | V56 |     |     |     |     |   |
|   |   |   |   |     |     |     |     |   |
|   |   |   |   |     |     |     |     |   |

FIG. 25

|   |   |   |   |     |     |   |   |   |
|---|---|---|---|-----|-----|---|---|---|
|   |   |   |   |     |     |   |   |   |
|   |   |   |   |     |     |   |   |   |
|   |   |   |   | d25 | d14 |   |   |   |
|   |   |   |   | d15 | d35 |   |   |   |
|   |   |   | d16 |     |     |   |   |   |
|   |   |   |   |     |     |   |   |   |
|   |   |   |   |     |     |   |   |   |
|   |   |   |   |     |     |   |   |   |

FIG. 26

|   |   |   |   |     |     |   |   |   |
|---|---|---|---|-----|-----|---|---|---|
|   |   |   |   |     |     |   |   |   |
|   |   |   |   |     |     |   |   |   |
|   |   |   |   |     | a14 |   |   |   |
|   |   |   |   | a15 |     |   |   |   |
|   |   |   | a16 |     |     |   |   |   |
|   |   |   |   |     |     |   |   |   |
|   |   |   |   |     |     |   |   |   |
|   |   |   |   |     |     |   |   |   |

FIG. 27

|     |     |     |     |     |     |     |     |     |
|-----|-----|-----|-----|-----|-----|-----|-----|-----|
|     |     |     |     |     |     |     |     |     |
| V49 |     |     | V46 | V45 | V44 |     |     | V41 |
| V29 | V28 | V27 | V26 | V25 | V24 | V23 | V22 | V21 |
| V19 | V18 | V17 | V16 | V15 | V14 | V13 | V12 | V11 |
| V39 | V38 | V37 | V36 | V35 | V34 | V33 | V32 | V31 |
| V59 |     |     | V56 | V55 | V54 |     |     | V51 |
|     |     |     |     |     |     |     |     |     |
|     |     |     |     |     |     |     |     |     |

FIG. 28

|   |   |   |   |     |     |     |   |   |   |
|---|---|---|---|-----|-----|-----|---|---|---|
|   |   |   |   |     |     |     |   |   |   |
|   |   |   |   |     |     |     |   |   |   |
|   |   |   |   |     | d25 |     |   |   |   |
|   |   |   |   | d16 | d15 | d14 |   |   |   |
|   |   |   |   |     | d35 |     |   |   |   |
|   |   |   |   |     |     |     |   |   |   |
|   |   |   |   |     |     |     |   |   |   |
|   |   |   |   |     |     |     |   |   |   |

FIG. 29

|   |   |   |   |     |     |     |   |   |   |
|---|---|---|---|-----|-----|-----|---|---|---|
|   |   |   |   |     |     |     |   |   |   |
|   |   |   |   |     |     |     |   |   |   |
|   |   |   |   |     |     |     |   |   |   |
|   |   |   |   | a16 | a15 | a14 |   |   |   |
|   |   |   |   |     |     |     |   |   |   |
|   |   |   |   |     |     |     |   |   |   |
|   |   |   |   |     |     |     |   |   |   |
|   |   |   |   |     |     |     |   |   |   |

FIG. 30

|   |   |   |   |   |   |   |   |   |
|---|---|---|---|---|---|---|---|---|
|   |   | V23 |   |   |   |   |   |   |
|   | V33 | V13 | V24 | V44 |   |   |   |   |
|   |   | V34 | V14 | V25 | V45 |   |   |   |
|   |   | V54 | V35 | V15 | V26 | V46 |   |   |
|   |   |   |   | V55 | V36 | V16 | V27 |   |
|   |   |   |   |   | V56 | V37 | V17 |   |
|   |   |   |   |   |   |   |   |   |
|   |   |   |   |   |   |   |   |   |

FIG. 31

|   |   |   |   |   |   |   |   |   |
|---|---|---|---|---|---|---|---|---|
|   |   |   |   |   |   |   |   |   |
|   |   |   |   |   |   |   |   |   |
|   |   |   |   |   |   |   |   |   |
|   |   |   | d14 | d25 |   |   |   |   |
|   |   |   | d35 | d15 |   |   |   |   |
|   |   |   |   |   | d16 |   |   |   |
|   |   |   |   |   |   |   |   |   |
|   |   |   |   |   |   |   |   |   |
|   |   |   |   |   |   |   |   |   |

FIG. 32

|   |   |   |   |   |   |   |   |   |
|---|---|---|---|---|---|---|---|---|
|   |   |   |   |   |   |   |   |   |
|   |   |   |   |   |   |   |   |   |
|   |   |   |   |   |   |   |   |   |
|   |   |   | a14 |   |   |   |   |   |
|   |   |   |   | a15 |   |   |   |   |
|   |   |   |   |   | a16 |   |   |   |
|   |   |   |   |   |   |   |   |   |
|   |   |   |   |   |   |   |   |   |
|   |   |   |   |   |   |   |   |   |

FIG. 33

| | | V51 | V31 | V11 | V21 | V41 | | |
|---|---|---|---|---|---|---|---|---|
| | | | V32 | V12 | V22 | | | |
| | | | V33 | V13 | V23 | | | |
| | | V54 | V34 | V14 | V24 | V44 | | |
| | | V55 | V35 | V15 | V25 | V45 | | |
| | | V56 | V36 | V16 | V26 | V46 | | |
| | | | V37 | V17 | V27 | | | |
| | | | V38 | V18 | V28 | | | |
| | | V59 | V39 | V19 | V29 | V49 | | |

FIG. 34

| | | | | | | | | |
|---|---|---|---|---|---|---|---|---|
| | | | | | | | | |
| | | | | | | | | |
| | | | | d14 | | | | |
| | | | d35 | d15 | d25 | | | |
| | | | | d16 | | | | |
| | | | | | | | | |
| | | | | | | | | |
| | | | | | | | | |

FIG. 35

| | | | | | | | | |
|---|---|---|---|---|---|---|---|---|
| | | | | | | | | |
| | | | | | | | | |
| | | | | a14 | | | | |
| | | | | a15 | | | | |
| | | | | a16 | | | | |
| | | | | | | | | |
| | | | | | | | | |
| | | | | | | | | |

|     |     |     |     |     |     |     |     |     |
|-----|-----|-----|-----|-----|-----|-----|-----|-----|
|     |     |     |     |     |     |     |     |     |
| V59 |     |     | V56 | V55 | V54 |     |     | V51 |
| V39 | V38 | V37 | V36 | V35 | V34 | V33 | V32 | V31 |
| V19 | V18 | V17 | V16 | V15 | V14 | V13 | V12 | V11 |
| V29 | V28 | V27 | V26 | V25 | V24 | V23 | V22 | V21 |
| V49 |     |     | V46 | V45 | V44 |     |     | V41 |
|     |     |     |     |     |     |     |     |     |
|     |     |     |     |     |     |     |     |     |

FIG. 40

|   |   |   |   |   |   |   |   |   |
|---|---|---|---|---|---|---|---|---|
|   |   |   |   |   |   |   |   |   |
|   |   |   |   |   |   |   |   |   |
|   |   |   |   | d35 |   |   |   |   |
|   |   |   | d16 | d15 | d14 |   |   |   |
|   |   |   |   | d25 |   |   |   |   |
|   |   |   |   |   |   |   |   |   |
|   |   |   |   |   |   |   |   |   |
|   |   |   |   |   |   |   |   |   |

FIG. 41

|   |   |   |   |   |   |   |   |   |
|---|---|---|---|---|---|---|---|---|
|   |   |   |   |   |   |   |   |   |
|   |   |   |   |   |   |   |   |   |
|   |   |   |   |   |   |   |   |   |
|   |   |   | a16 | a15 | a14 |   |   |   |
|   |   |   |   |   |   |   |   |   |
|   |   |   |   |   |   |   |   |   |
|   |   |   |   |   |   |   |   |   |
|   |   |   |   |   |   |   |   |   |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 15 | 15 | 15 | 0 | 0 | 0 | 0 | 0 |
| 0 | 0 | 0 | 15 | (15) | 15 | 15 | 15 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 47

| 0 | 0 | 0 | 0 | 0 | 0 | 0 | 0 |
|---|---|---|---|---|---|---|---|
| 0 | 0 | 0 | 0 | 0 | 0 | 0 | 0 |
| 3 | 3 | 3 | 4 | 0 | 0 | 0 | 0 |
| 0 | 0 | 4 | 3 | 3 | 3 | 3 | 3 |
| 7 | 7 | 7 | 8 | 0 | 0 | 0 | 0 |
| 0 | 0 | 8 | 7 | 7 | 7 | 7 | 7 |
| 0 | 0 | 0 | 0 | 0 | 0 | 0 | 0 |
| 0 | 0 | 0 | 0 | 0 | 0 | 0 | 0 |

FIG. 48

| 0 | 0 | 0 | 15 | 0 | 0 | 0 | 0 |
|---|---|---|----|---|---|---|---|
| 0 | 0 | 0 | 15 | 0 | 0 | 0 | 0 |
| 0 | 0 | 0 | 15 | 0 | 0 | 0 | 0 |
| 0 | 0 | 0 | 15 | 0 | 0 | 0 | 0 |
| 0 | 0 | 15 | 0 | 0 | 0 | 0 | 0 |
| 0 | 0 | (15) | 0 | 0 | 0 | 0 | 0 |
| 0 | 0 | 15 | 0 | 0 | 0 | 0 | 0 |
| 0 | 0 | 15 | 0 | 0 | 0 | 0 | 0 |

FIG. 49

| 0 | 0 | 1 | 0 | 5 | 0 | 0 | 0 |
|---|---|---|---|---|---|---|---|
| 0 | 0 | 1 | 0 | 5 | 0 | 0 | 0 |
| 0 | 0 | 1 | 0 | 5 | 0 | 0 | 0 |
| 0 | 2 | 1 | 0 | 5 | 0 | 0 | 0 |
| 0 | 1 | 2 | 5 | 6 | 0 | 0 | 0 |
| 0 | 1 | 0 | 5 | 0 | 0 | 0 | 0 |
| 0 | 1 | 0 | 5 | 0 | 0 | 0 | 0 |
| 0 | 1 | 0 | 5 | 0 | 0 | 0 | 0 |

FIG. 50

| 15 | 15 | 7 |
|----|----|---|
| 15 | 15 | 5 |
| 15 | 11 | 0 |
| 15 | 9  | 0 |
| 15 | 7  | 0 |

|   |    |   |
|---|----|---|
| 13| 14 | 13|
| 14| 15 | 14|
| 13| 14 | 13|

FIG. 52

|   |    |   |
|---|----|---|
| 0 | 0  | 0 |
| 0 | 15 | 0 |
| 0 | 0  | 0 |

FIG. 53

|   |    |    |
|---|----|----|
| 0 | 0  | 15 |
| 0 | 15 | 15 |
| 0 | 15 | 15 |

FIG. 54

| 0 | 0 | 0  | 15 | 0 | 0 | 0 | 0 |
|---|---|----|----|---|---|---|---|
| 0 | 0 | 0  | 15 | 0 | 0 | 0 | 0 |
| 0 | 0 | 0  | 15 | 0 | 0 | 0 | 0 |
| 0 | 0 | 15 | 15 | 0 | 0 | 0 | 0 |
| 0 | 0 | 15 | 0  | 0 | 0 | 0 | 0 |
| 0 | 0 | 15 | 0  | 0 | 0 | 0 | 0 |
| 0 | 0 | 15 | 0  | 0 | 0 | 0 | 0 |
| 0 | 0 | 15 | 0  | 0 | 0 | 0 | 0 |

FIG. 55

RESOLUTION ENHANCEMENT SYSTEM FOR DIGITAL IMAGES

CROSS-REFERENCE TO RELATED APPLICATION

This application is related to commonly assigned U.S. application Ser. No. 08/708,272 filed on even date herewith in the name of Yee S. Ng. and entitled, "Printing of Enhanced Images".

BACKGROUND OF THE INVENTION

1. Field of the Invention

The invention relates generally to digital image processing and, more specifically, to a digital image processing system for enhancing the edge characteristics of printed or displayed images that are generated from low resolution image files, which include binary image data alone or a mixture of binary and gray-scale image data.

2. Description Relative to the Prior Art

Edge or line jaggedness is a common problem associated with the printing of low resolution binary image data. Efforts have been made to reduce or overcome line jaggedness using template matching methods that are applied to low resolution bitmaps as described in U.S. Pat. No. 5,005,139 or, alternatively, through the use of an outline extraction method like that described in the article entitled "Image Makers", by Henry Bortman, MacUser, November 1991, pages 98–103. Both of the above-referenced methods use a low resolution bitmap as an input file and both methods perform digital processing operations on the low resolution bitmap to produce an enhanced image output file. The enhanced output file is supplied to the printhead or a printer to produce a hard copy of the image.

There are disadvantages, however, to both of the template matching and outline extraction methods of edge enhancement discussed above. In the template matching method, the number of templates that can be employed must be limited in order to maintain acceptable processing speeds. If a pattern within the bitmap data contained in the input file does not happen to match one of the available templates, an edge resolution enhancement operation cannot be performed regardless of the quality of the image that will be produced from the input data. In the outline extraction method, variable dot sizes are used to "fill in" and match a character's outline. The fill in process, however, can be difficult when small fonts are employed. In addition, the outline extraction method tends to broaden thin graph lines that are spaced close together which results in the merger of multiple lines and a perceivable reduction in the resolution of the printed image.

Another drawback to the above-described processes is that they tend to have a negative impact on the gray scale halftone data. Thus, the processes are not particularly well suited for processing mixed image data files containing both binary image data and gray-scale halftone image data. Mixed data files, however, are becoming more and more common. Many imaging systems or multiple function devices, for example, now combine text data with gray-scale halftoned image data and binary graphic data in a single image file.

In U.S. Pat. No. 5,450,531 there is disclosed a system for performing edge enhancement of mixed low resolution image files which employs a binarization and sorting unit to sort data that is indicative of binary data from the mixed low resolution image input file. The sorted binary data is then supplied to a binary data edge enhancement processor for edge enhancement processing. The output from the binary data edge enhancement processor unit is supplied to a data merger unit along with the original image data. The data merger unit determines whether the original image data was part of a grayscale image. If the data merger unit determines that the original data is binary image data, the output from the binary edge enhancement processor unit is supplied as the output of the processing system. While the system described in this patent works well, there is a need for a system that operates with both gray level and binary printheads. There is also a need for a system that operates at higher speeds to furnish data in real time to high speed engines. There is further a need for a system that operates well with multiple function devices.

The above and other needs and objectives are accomplished in accordance with the invention described herein.

SUMMARY OF THE INVENTION

An image processing system is provided for performing edge enhancement processing of low resolution binary image files in sections or windows using a binary edge enhancement processor unit to determine whether an edge transition or "kink site" occurs within each window. The edge enhancement processor includes a decision matrix that identifies a pixel based on a calculated gradient magnitude and direction. The original data in the window is replaced with edge enhanced gray-scale data stored in a look-up table if a kink site is identified. The system further includes the use of a binarization and sorting unit to sort binary data from a mixed low resolution image input file. The sorted binary data is supplied to the binary data edge enhancement processor for edge enhancement processing. The output from the binary data edge enhancement processor unit is supplied to a data merger unit along with the original image data to generate an output image file. The binary data edge enhancement processor is further provided with a low-high decision matrix, in order to generate output image files for use with printers having resolutions greater than the input image file.

More specifically, in accordance with a first aspect of the invention, there is provided an image data processing apparatus comprising means for providing first binary image data of a plurality of pixel locations, the image data being of a first pixel resolution, means for determining a gradient magnitude corresponding to each pixel location of the first binary image data, means for determining a gradient direction corresponding to each pixel location of the first binary image data, decision matrix means for comparing a window of pixel locations of the first binary image data and the gradient magnitudes and directions corresponding thereto to a predetermined set of criteria and generating an output signal indicative of the comparison, and means for generating second binary image data of a second pixel resolution that is higher than said first resolution in response to the output signal of the decision matrix means.

In accordance with a second aspect of the invention, there is provided an image data processing apparatus for generating enhanced image data, the apparatus comprising means for separating a raster line of pixels into line segments for processing in plural channels, a decision matrix means in each of said channels for comparing a respective window of pixel locations to a predetermined set of criteria and generating a respective output signal indicative of the comparison, and means for generating respective enhanced image data in response to the respective output signal of the decision matrix means.

In accordance with a third aspect of the invention, there is provided an image data processing apparatus for generating enhanced image data, the apparatus comprising decision matrix means for comparing a window of pixel data to a predetermined set of criteria and generating a respective output signal indicative of the comparison, the decision matrix means including means operating to determine plural criteria simultaneously with the output signal determined in accordance with a bias towards a determination of a finding of closer proximity towards a site likely to require image enhancement.

In accordance with a fourth aspect of the invention, there is provided an image data processing apparatus comprising means for comparing a window of pixel data of an image including first binary image data of a first pixel resolution and gradient values corresponding to the image data to a predetermined set of criteria and generating a signal indicative of the comparison, and means for generating second binary image data of a second pixel resolution that is higher than said first resolution in response to the signal.

In accordance with a fifth aspect of the invention, there is provided an image data processing apparatus for generating enhanced image data, the apparatus comprising means for separating a line of pixels, for example a raster line, into line segments for processing in plural channels, a decision matrix means in each of said channels for comparing a respective window of pixel data to a predetermined set of criteria and generating a respective output signal indicative of the comparison, means for generating respective enhanced image data in response to the respective output signal of the decision matrix means, and wherein each decision matrix means includes means operating to determine plural criteria simultaneously with a respective output signal determined in accordance with a bias towards a determination of a finding of closer proximity towards a site likely to require image enhancement.

In accordance with a sixth aspect of the invention, there is provided an image data processing method for generating enhanced image data, the method comprising providing a raster line of pixels in line segments for processing in plural channels, in each of said channels, comparing a respective window of pixel data to a predetermined set of criteria and generating a respective output signal indicative of the comparison, and generating respective enhanced image data in response to the respective output signal.

In accordance with a seventh aspect of the invention, there is provided an image data processing method for generating enhanced image data, the method comprising providing pixel data, comparing a window of the pixel data to a predetermined set of criteria and generating a respective output signal indicative of the comparison, in the step of comparing operating to determine plural criteria simultaneously with the output signal determined in accordance with a bias towards a determination of a finding of closer proximity towards a site likely to require image enhancement.

In accordance with a eighth aspect of the invention, there is provided an image data processing method comprising comparing a window of pixel data of an image including first binary image data of a first pixel resolution and gradient values corresponding to the image data to a predetermined set of criteria and generating a signal indicative of the comparison, and generating second binary image data of a second pixel resolution that is higher than said first resolution in response to the signal.

In accordance with a ninth aspect of the invention, there is provided an image data processing method for generating enhanced image data, the method comprising separating a raster line of pixel data into line segments for processing in plural channels, comparing in each of said channels a respective window of pixel data to a predetermined set of criteria and generating a respective output signal indicative of the comparison, generating respective enhanced image data in response to the respective output signal of the decision matrix means, and wherein in the step of comparing operating to determine plural criteria simultaneously with a respective output signal determined in accordance with a bias towards a determination of a finding of closer proximity towards a site likely to require image enhancement.

BRIEF DESCRIPTION OF THE DRAWINGS

With the above as background, reference should now be made to the following description of the best mode for carrying out the invention and the accompanying drawings wherein:

FIGS. 2 and 2A–2D is an example of binary bitmap data applied to the input of the edge enhancement processing system shown in FIG. 1;

FIGS. 3 and 3A–3D is a gradient magnitude map of the binary bitmap data shown in FIG. 2;

FIG. 4 is a gradient angle map of the binary bitmap data shown in FIG. 2;

FIG. 6 illustrates an 8×8 window of binary data for a near vertical line;

FIG. 7 illustrates the gradient directions corresponding to each pixel location of the window shown in FIG. 6;

FIG. 8 illustrates the gradient magnitudes corresponding to each pixel location of the window shown in FIG. 6;

FIG. 9 illustrates a 3×5 window of binary data for a near horizontal line;

FIG. 10 illustrates the gradient directions corresponding to each pixel location of the window shown in FIG. 9;

FIG. 11 illustrates the gradient magnitudes corresponding to each pixel location of the window shown in FIG. 9;

FIGS. 12–14 respectively illustrate pixel values, gradient directions and gradient magnitudes for a 5×3 window of pixels surrounding a kink site located in the 8×8 window of FIG. 6;

FIGS. 15–17 respectively illustrate the pixel values, gradient directions and gradient magnitudes shown in FIGS. 12–14 rotated to a preferred orientation;

FIGS. 18–20 respectively illustrate the pixel values, gradient directions and gradient magnitudes shown in FIGS. 9–11 rotated to a preferred orientation;

FIG. 21 illustrates a template that is utilized to identify a kink site;

FIGS. 22–24 respectively illustrate the pixel value, gradient direction and gradient magnitude maps for a central pixel having a gradient direction of one;

FIGS. 25–27 respectively illustrate the pixel value, gradient direction and gradient magnitude maps for a central pixel having a gradient direction of two;

FIGS. 28–30 respectively illustrate the pixel value, gradient direction and gradient magnitude maps for a central pixel having a gradient direction of three;

FIGS. 31–33 respectively illustrate the pixel value, gradient direction and gradient magnitude maps for a central pixel having a gradient direction of four;

FIGS. 34–36 respectively illustrate the pixel value, gradient direction and gradient magnitude maps for a central pixel having a gradient direction of five;

Figures 37, 38, 39:
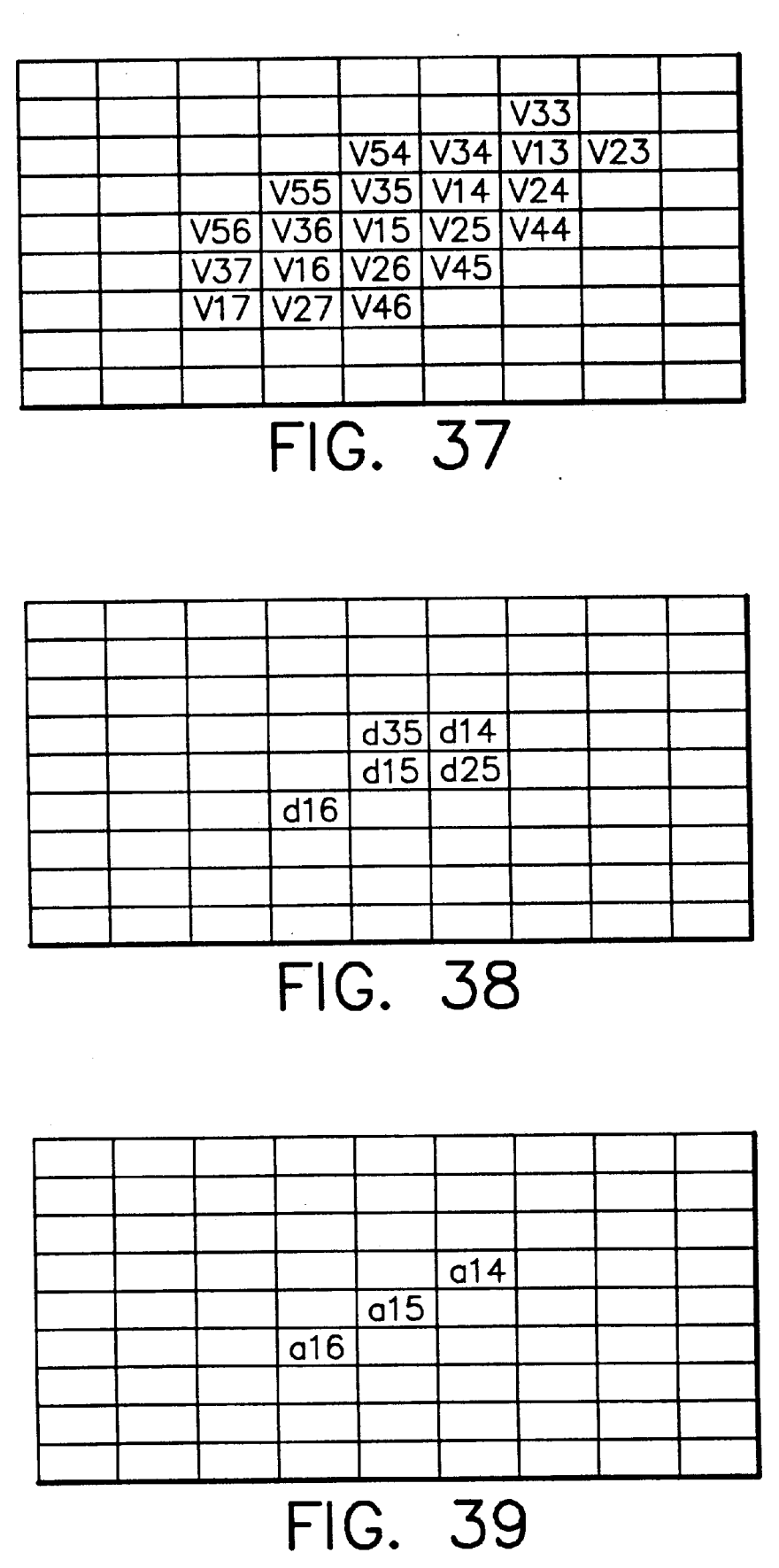

FIGS. 37–39 respectively illustrate the pixel value, gradient direction and gradient magnitude maps for a central pixel having a gradient direction of six;

FIGS. 40–42 respectively illustrate the pixel value, gradient direction and gradient magnitude maps for a central pixel having a gradient direction of seven;

Figures 43, 44, 45:
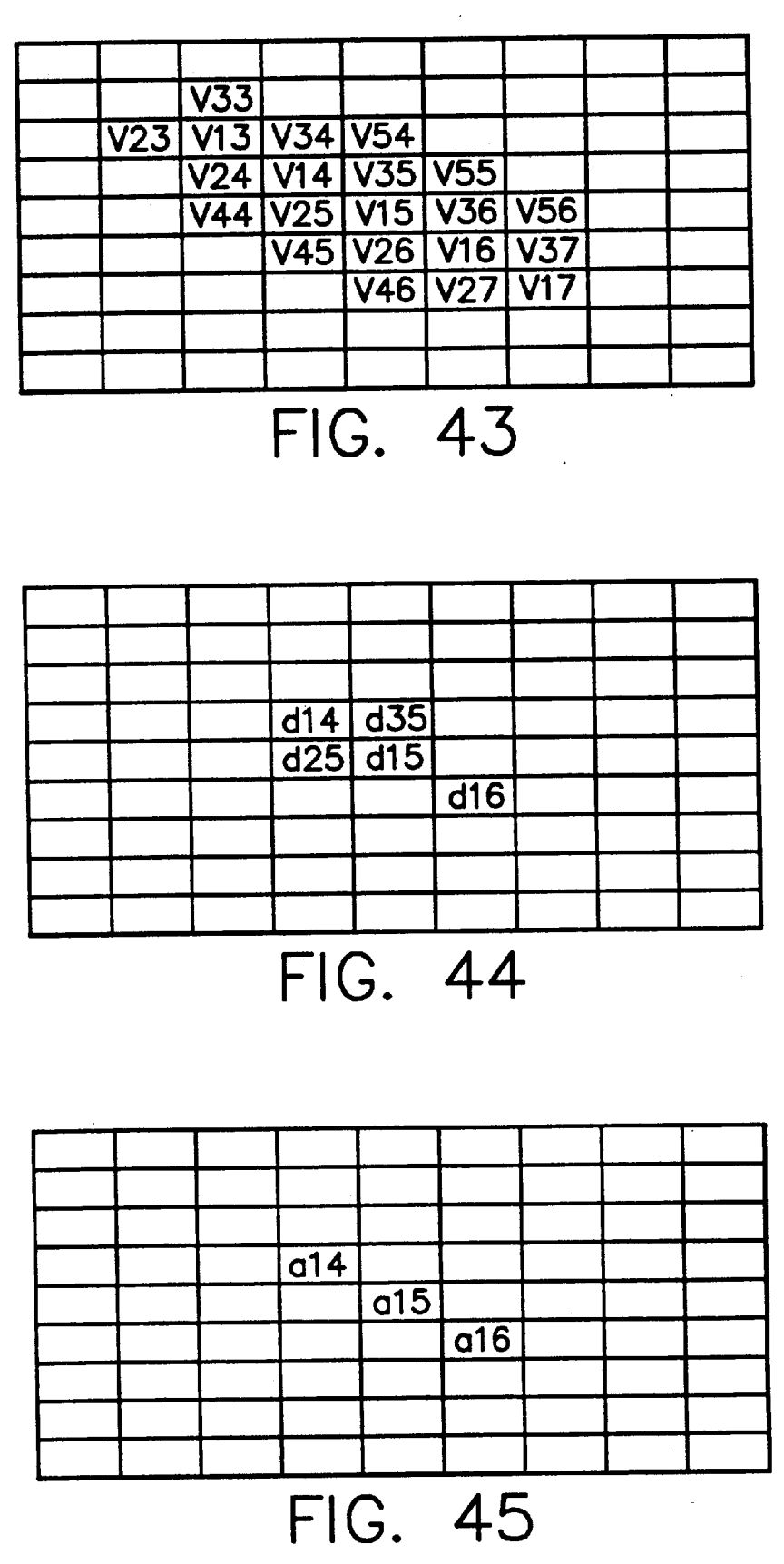

FIGS. 43–45 respectively illustrate the pixel value, gradient direction and gradient magnitude maps for a central pixel having a gradient direction of eight;

FIG. 46 is a window illustrating a one pixel wide horizontal line;

FIG. 47 illustrates the gradient directions corresponding to the pixel locations shown in FIG. 46;

FIG. 48 is a window illustrating a one pixel wide vertical line;

FIG. 49 illustrates the gradient directions corresponding to the pixel locations shown in FIG. 48;

FIG. 50 is an example of enhanced gray-scale output data corresponding to the original binary image data illustrated in FIG. 12;

FIG. 52 is a 3×3 window of original image data containing gray-scale data that is supplied to the binarization and sorting unit shown in FIG. 51;

FIG. 53 is a 3×3 window of sorted image data produced from the binarization and sorting unit shown in FIG. 51 when the mixed image data of FIG. 52 is applied thereto;

FIG. 54 is a 3×3 window of original image data containing binary data that is supplied to the binarization and sorting unit shown in FIG. 51;

FIG. 55 is an 8×8 window illustrating a special case of a single pixel line in which the first pixel of a kink site overlaps an adjacent pixel.

BEST MODE OF CARRYING OUT THE INVENTION

Figure 1:
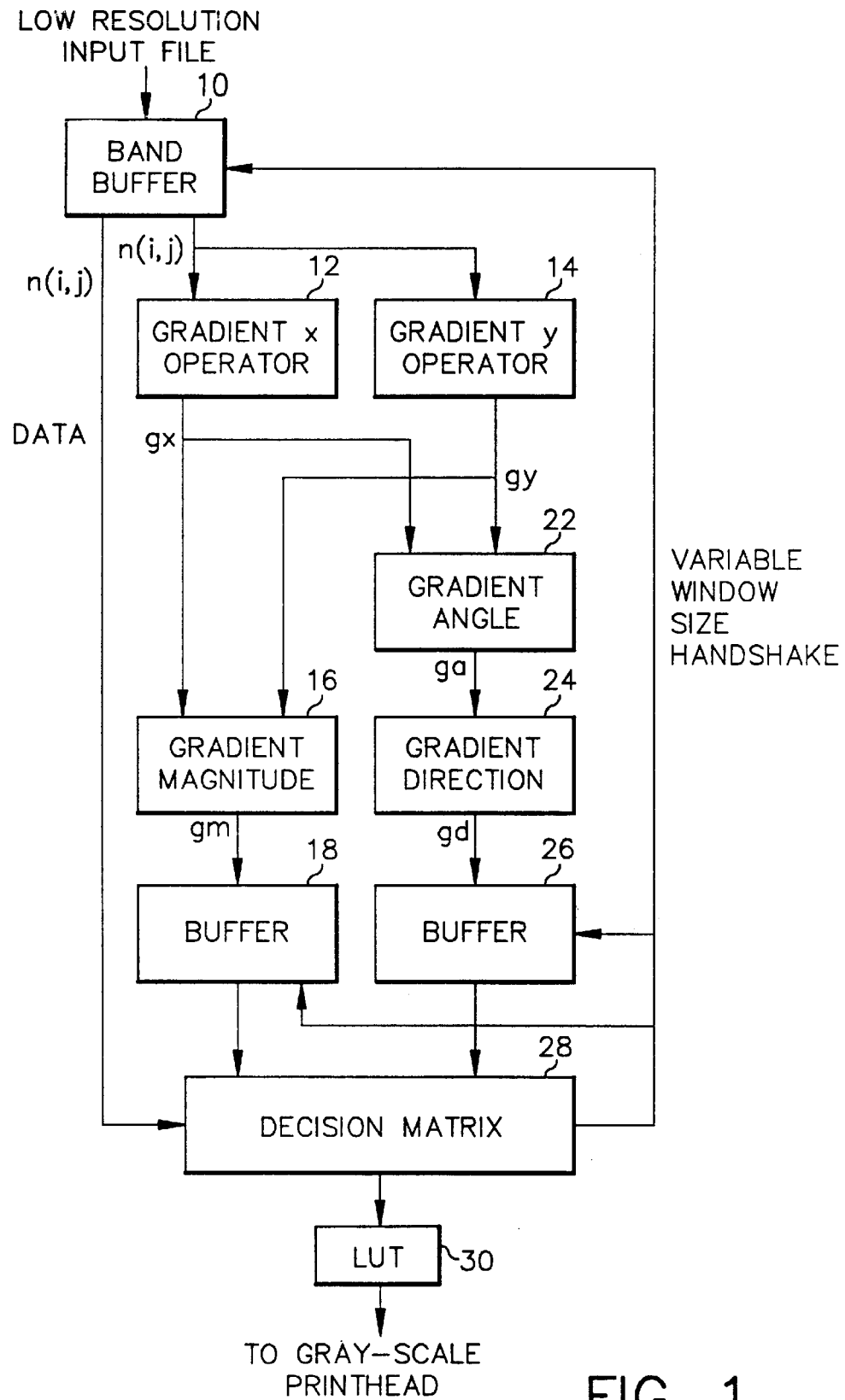
FIG. 1 is a functional block diagram of a gray level resolution edge enhancement processing system (GRET) in accordance with the prior art.

The preferred embodiment to be described provides a system and method for performing edge enhancement of low resolution binary image files that is flexible and adaptable to high speed processing operations without causing a degradation in image resolution. Operations are performed by the system to obtain outline gradient magnitudes and directions which are used, in combination with the original bitmap data, to reduce the tangential gradient magnitude change (jaggedness) of lines or text within a printed image while preserving the gradient angle (shape of the line or text) without sacrificing the normal gradient magnitude (sharpness of the line or text). Specifically, the system processes the low resolution bitmap data in sections or windows to determine whether an edge transition or "kink site" occurs within each window. The original bitmap data in the window is then replaced with edge enhanced gray scale data if a kink site is identified. The selection of the correct edge enhanced gray-scale data to be used in place of the original bitmap data is based on whether the central pixel contained within the window is a black or white pixel, whether the central pixel is located on a single pixel line and the location of the central pixel with respect to the kink site. The determination of whether the central pixel is a black or white pixel is based on the binary value assigned to the pixel, the determination of the location of the central pixel with respect to the kink site is based on pixel values and gradient magnitudes of surrounding pixel locations, and the determination of whether the central pixel is located on a single pixel line is based on the gradient magnitude of the central pixel and surrounding pixel locations.

The system preferably determines the gradient angles of the pixels contained within the window prior to performing the operations described above. A limited number of gradient directions are then assigned to the pixels based on the gradient angles. The system uses the gradient directions to rotate the window to a selected reference direction in order to simplify the identification of kink sites within the window and the selection of the edge enhanced gray scale data as will be described in greater detail below.

A further embodiment provides a system for performing edge enhancement of mixed low resolution image files that is flexible and adaptable to high speed processing operations without causing a degradation in image resolution. The system employs a binarization and sorting unit to sort data that is indicative of binary data from the mixed low resolution image input file. The sorted binary data is then supplied to a binary data edge enhancement processor for edge enhancement processing. The output from the binary data edge enhancement processor unit is supplied to a data merger unit along with the original image data. The data merger unit determines whether the original image data for a particular pixel location was gray-scale image data. If the data merger determines the original data was gray-scale image data, the original data is supplied as the output of the processing system for that pixel location. If the data merger determines that the original data is binary image data, the output from the binary edge enhancement processor unit is supplied as the output of the processing system.

A functional block diagram of an edge enhancement processing system in accordance with the invention is illustrated in FIG. 1. A low resolution binary bitmap (300 dpi or 11.86 dots per mm) generated, for example, by using a commercially available software package such as PostScript, is stored in a band buffer 10, where n(i,j) is a pixel value within the bitmap at location (i,j). The term "binary" bitmap or image will be understood by those skilled in the art to refer to a bit map or image in which image pixels are either fully exposed or are unexposed, i.e. no gray-scale pixel data is present. The term "gray-scale"

refers to image data wherein each pixel is represented by more than one bit of data to indicate one or more shades of gray between fully exposed and unexposed. Of course, the actual color of the pixel will be dependent upon the color toner or pigment used in a printing process to develop the pixel. An example of such a binary bitmap for a portion of the letter "R" is illustrated in FIG. 2, wherein exposed areas of an image (in the illustrated embodiment) are identified, in this example, by the numeral 255 (i.e. pixel exposed) and non-exposed areas are identified by zero (i.e. pixel not exposed). As an example, this range of 0 and 255 is expressed as an 8-bits/pixel range.

Sobel gradient masks 12, 14 for both the horizontal (sobelx) and vertical (sobely) directions operate on the binary bitmap data n(i,j) to produce a gradient x operator (gx) and a gradient y operator (gy). Typical sobel gradient masks that can be employed include:

sobelx=(−1 0 1, −2 0 2, −1 0 1)

where gx (i,j)=sobelx*n(i,j); and sobely=(−1−2−1, 0 0 0, 1 2 1)

where gy (i,j)=sobely*n(i,j)

The gradient amplitude or magnitude (gm) 16 is then calculated by taking the square root of the sum of the square of the gradient x operator (gx) and the square of the gradient y operator (gy) (See Eq. 1) for each location in the bitmap to produce a gradient magnitude map (See FIG. 3). The gradient magnitude map is then stored in the a buffer 18 for later use.

$$gm(i,j)=\text{sqrt } (gx(i,j)2+gy(i,j)2) \qquad \text{Eq. (1)}$$

Similarly, the gradient angle (ga) 20 is determined for each location using the following equation:

$$ga(i,j)=\tan-1(gy(i,j)/gx(i,j)) \qquad \text{Eq. (2)}$$

to produce a gradient angle map as shown in FIG. 4. It should be noted that an arctangent calculation can also be employed to calculate ga if desired.

For purposes of convenience, the gradient angle ga is preferably limited to a choice of gradient directions gd by a gradient direction sorter 24. For example, eight directions are preferably employed using the following sort criteria:

$$gd=2, \text{ if } (68°>=ga>32)$$

$$gd=3, \text{ if}(113°>=ga>68°)$$

$$gd=4, \text{ if } (158°>=ga>113°)$$

$$gd=5, \text{ if } (203°>=ga>158°)$$

$$gd=6, \text{ if } (248°>=ga>203°)$$

$$gd=7, \text{ if } (293°>=ga>248°)$$

$$gd=8, \text{ if } (338°>=ga>293°)$$

gd=1, if ga is between 338 and 23 degrees and gm isn't zero $$gd=0, \text{ if } gm=0$$

The gradient direction for each location is also stored in a buffer 26. It should be noted that the use of a finer separation criteria (i.e. more than eight directions) for gd can be employed if desired. The original bitmap data and the gradient magnitudes gm and gradient directions gd corresponding thereto are supplied to a decision matrix 28, which uses this information to select edge enhanced gray-scale output data to replace the original binary bitmap data.

In a preferred mode of operation, the decision matrix 28 determines whether the central pixel of a window of the original bitmap data is black or white pixel, whether the central pixel is contained in a single pixel line and the position of the pixel with respect to a kink site, by comparing the pixel data to a set of criteria represented by predetermined pixel values and gradient magnitudes. In accordance with rules establishing a set of criteria, the decision matrix generates an address that is supplied to a look-up table LUT 30. The LUT 30 generates edge enhanced gray-scale output data based on the address generated by the decision matrix 28. The enhanced gray scale output data replaces the original binary input data and produces a smoother image without jagged edges when applied to a gray scale printhead (for example a laser, LED, thermal, inkjet or other type of printhead) of a printer or to a gray level display such as a CRT or other suitable display.

It should be noted that the illustrated system can be implemented as a computer program executed on a general purpose computer or in hardware as a pipelined processing system, preferably in the form of an application specific integrated circuit (ASIC), or a combination thereof. Processing speeds can be improved by precalculating the gradient magnitudes and directions for all possible combinations of binary data within the window and storing the precalculated values within gradient magnitude and gradient direction LUTs. In operation, a window of binary data is supplied as an address to the gradient magnitude and gradient direction LUTs which then generate corresponding gradient magnitude and directions maps. The operation of the decision matrix can similarly be implemented with LUTs by supplying the original binary input data and corresponding gradient magnitude and direction information as an address thereto.

Figure 5A:
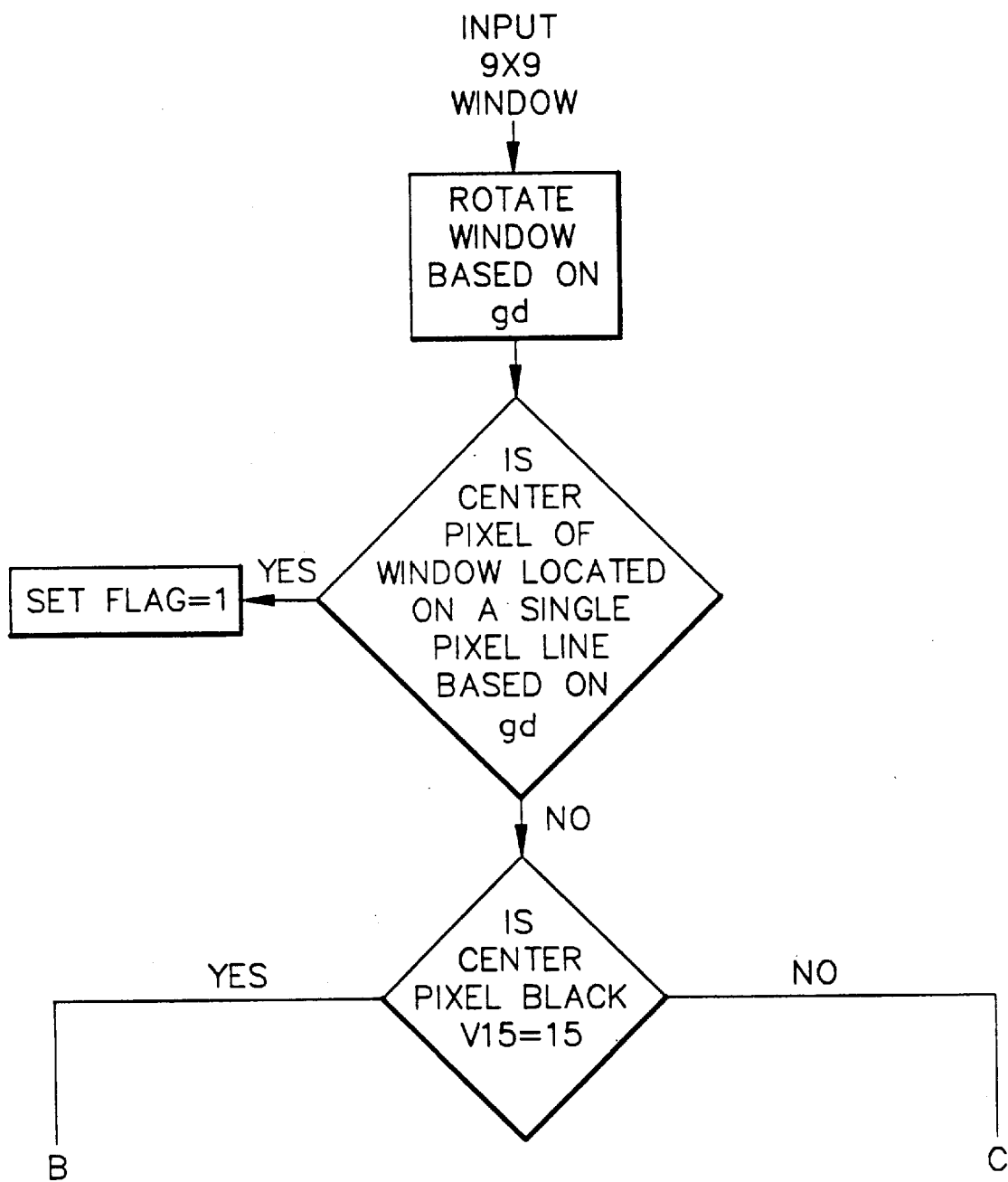
FIGS. 5A–5C is a functional flow diagram of the operation of the decision matrix employed in the edge enhancement processing system shown in FIG. 1.
Figure 5B:
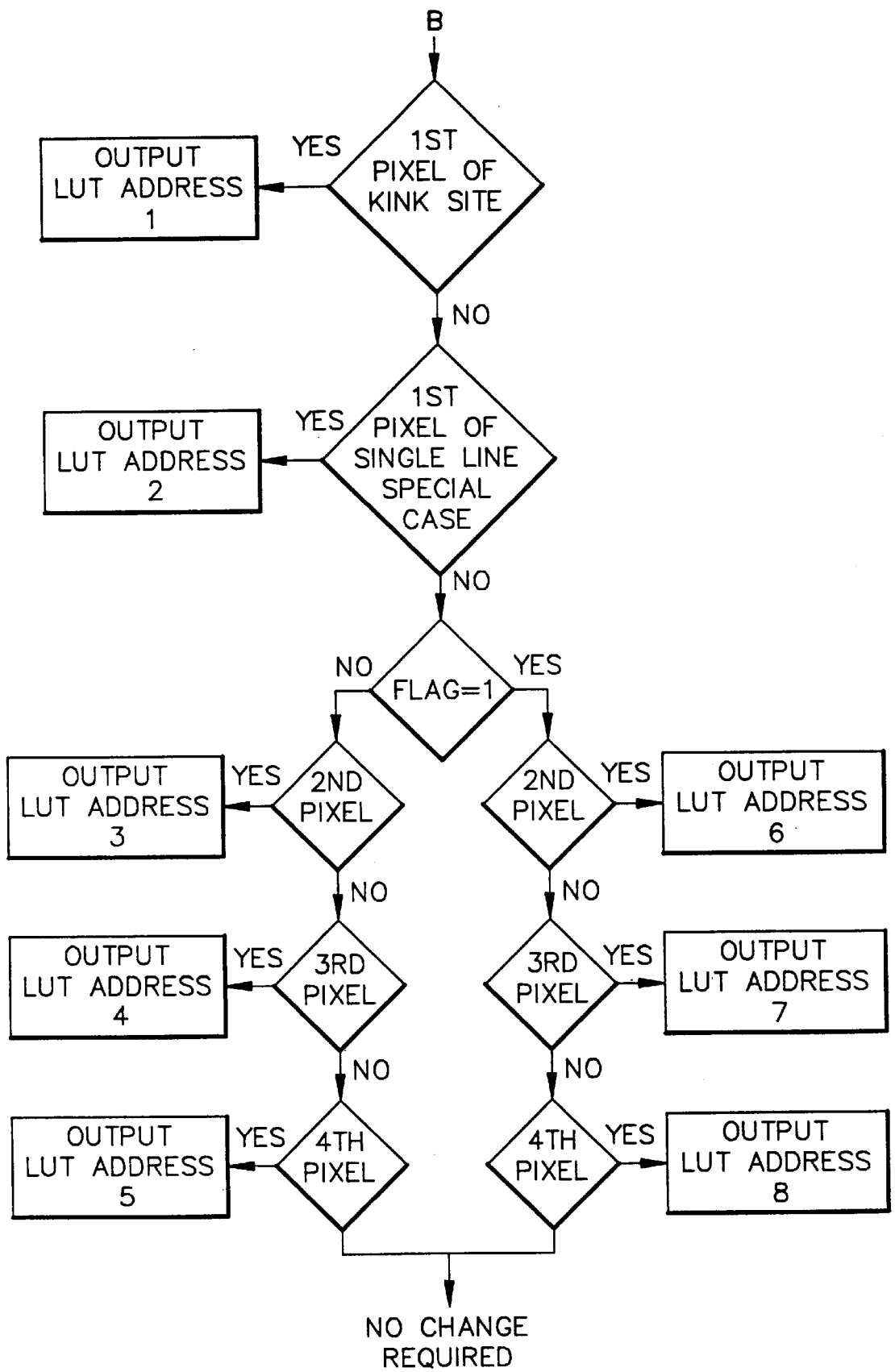
Figure 5C:
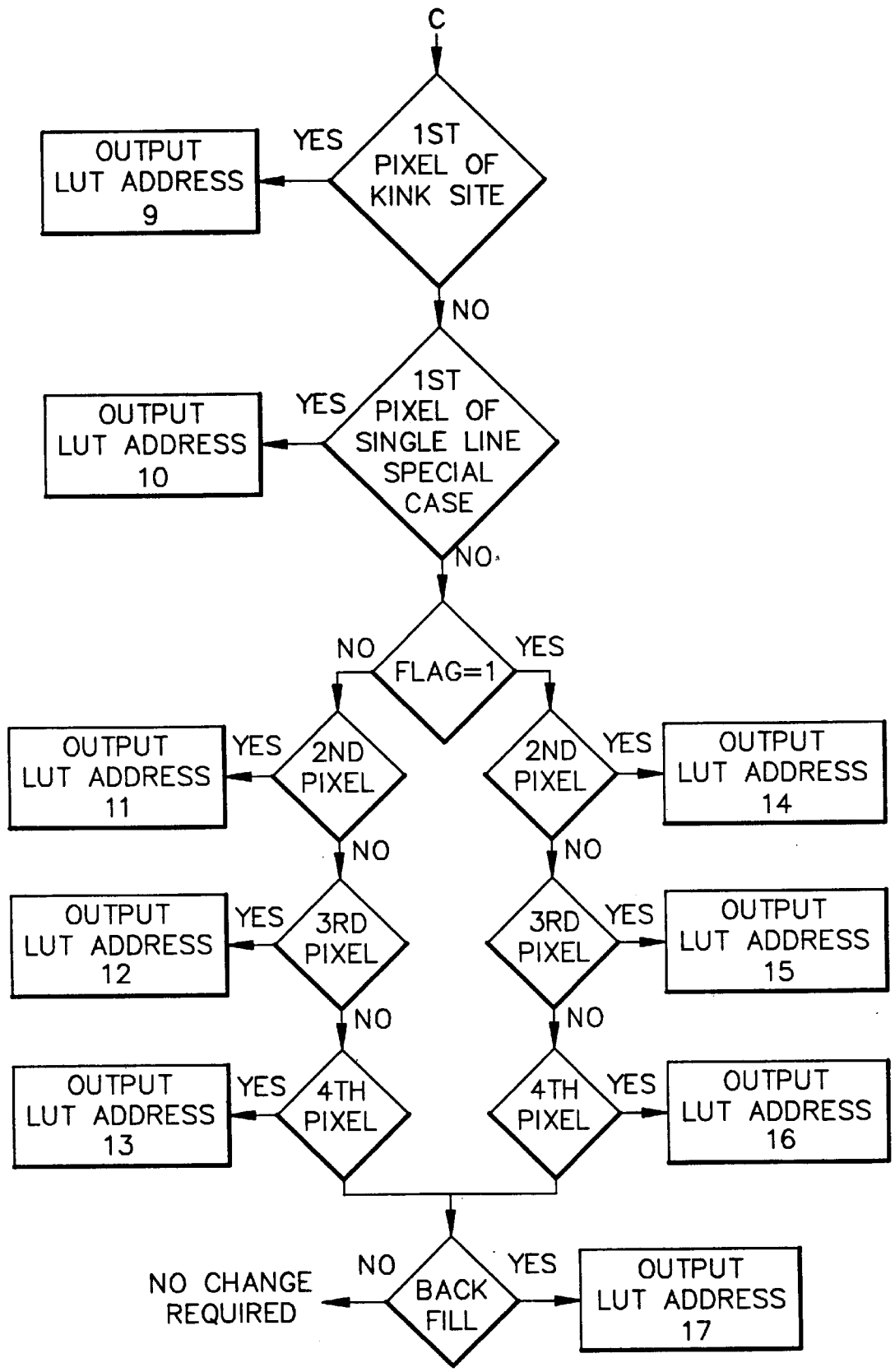
Figures 6, 7, 8, 9, 10, 11:
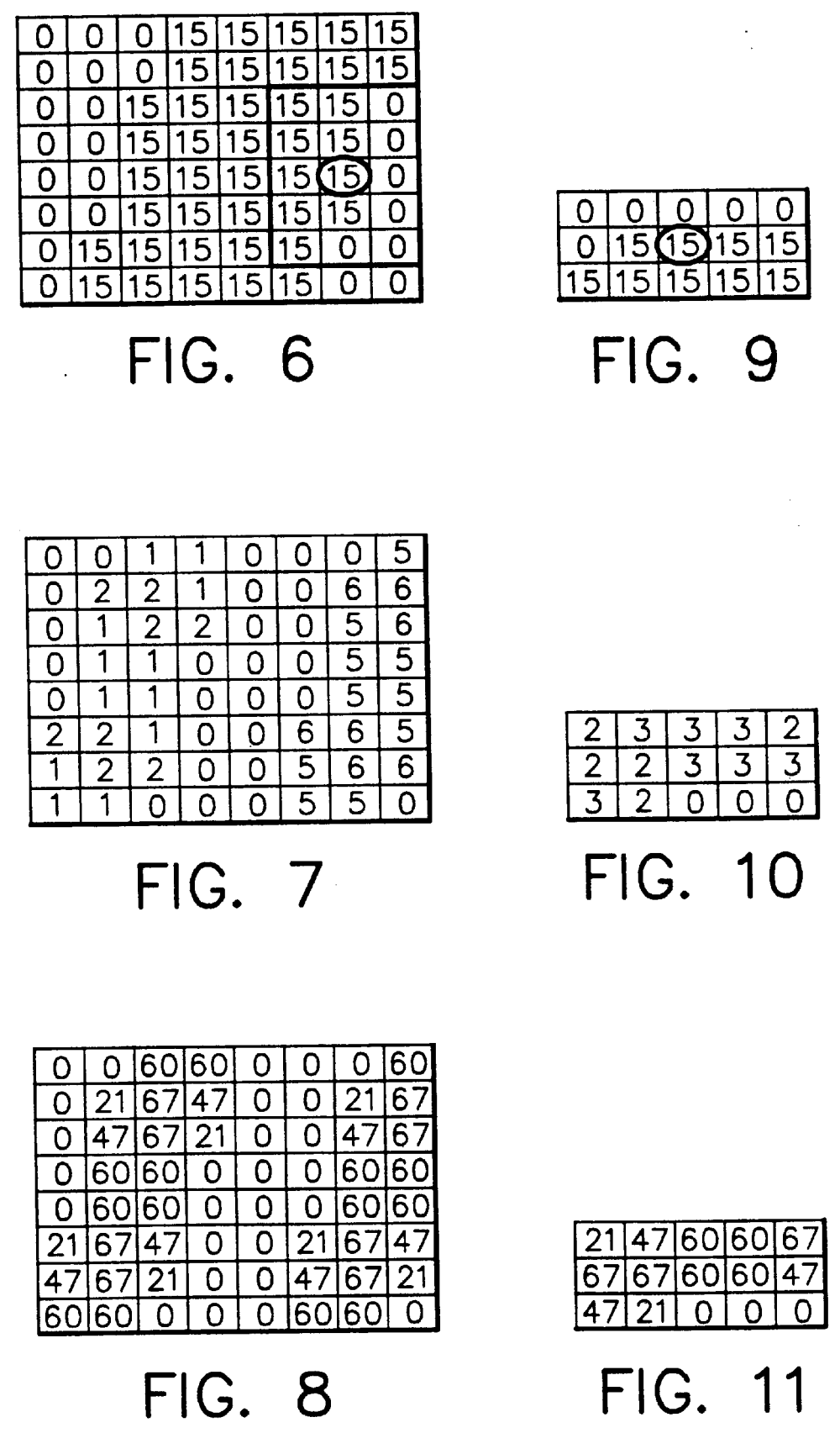

A general flow diagram of the operation of a decision matrix as implemented in software is illustrated by the decision tree in FIG. 5. FIG. 6 illustrates an 8×8 window of data retrieved from the original binary bitmap data previously stored in the band buffer. While an 8×8 window is shown, it is preferred to have larger windows such as 9×9 or greater. The pixel values illustrated in FIG. 6 are for a section of a near vertical line that is greater than one pixel in width. FIGS. 7 and 8, respectively, illustrate the gradient directions and magnitudes corresponding to each of the pixel values illustrated in FIG. 6. In this example, exposed pixels are denoted by the numeral fifteen and non-exposed pixels are denoted by zero.

The decision matrix first orients the pixel data via a rotation operation in order to decrease the number of template comparisons with the rules or sets of criteria that will be required to identify kink sites requiring edge correction. For example, a near vertical edge (see the circled second black pixel of a kink site shown in FIG. 6) can either be approached from the left (gd=1) or the right (gd=5) while a near horizontal line can be approached either from the top (gd=3) or the bottom (gd=7). An example of a near horizontal line segment is shown in FIGS. 9–11. In the case of the vertical line approached from the right, a 5×3 window of pixels surrounding the second black pixel of the kink site of the near vertical line as shown in FIGS. 12–14 can be rotated to a position illustrated in FIGS. 15–17 based on the direction of the second black pixel. Similarly, a 3×5 window of pixels surrounding the second black pixel (circled) of the kink site of the near horizontal line as shown in FIGS. 9–11 can also be rotated to a position illustrated in FIGS. 18–20. As the pixel values are identical for the rotated segments as shown in FIGS. 15 and 18, a single template or substitute bit map pattern can be used to identify kink sites in both near vertical lines approached from the right and the near horizontal lines approached from the top and the same enhanced gray-scale data can therefore be employed to smooth the kink site in both cases. In fact, all of the near vertical and near horizontal lines (for all four possible directions of approach) can be sorted through the rotation operation into a template matching the pixel configuration of FIGS. 15 and 18 or a template matching the configuration shown in FIG. 21, rather than the eight bit maps that would be required to be analyzed (two for each direction) if rotation were not employed. A similar procedure is utilized for near diagonal line segments (i.e. gd=2, 4, 6 or 8).

The rotation of the pixels within the windows is accomplished by a simple remapping routine. FIGS. 22–45 illustrate how the pixel values, gradient magnitudes and gradient direction correspond for each direction. For purposes of illustration, the pixel values for each pixel within the 9×9 window are denoted as V(x y), where V is the pixel value, x is a row position within the 9×9 window and y is a pixel position within the row. For example, as shown in FIG. 22, the pixel value of the central pixel within the 9×9 window is denoted by V15. Similarly, the gradient direction and magnitude for each pixel within the window is respectively denoted by d(x y) and a(x y).

In addition to rotating the pixel window to a predetermined direction, the pixel value of the central pixel within the window is analyzed to determine whether the pixel is a black pixel or a white pixel, whether the central pixel is located within a single pixel line and the location of the central pixel with respect to the kink site, as each of these factors can influence the type of enhanced data utilized to smooth the kink site. The determination of whether the pixel is black or white is made by a simple comparison of the pixel value to the value assigned to an exposed pixel. For example as expressed in a 4-bits/pixel range, in the embodiment just discussed, the central pixel is a black pixel if the pixel value is fifteen (V15=15) and the central pixel is a white pixel if the pixel value is zero (V15=0). The determination of whether the central pixel is located within a single pixel line is made by comparing the gradient direction of the central pixel to the gradient directions of surrounding pixels. For example, for the lower of the two horizontal single lines illustrated in FIG. 46, the second black pixel (circled) from the kink site has a direction of zero, while the pixel location above the second black pixel has a direction of three and the pixel location below the second black pixel has a direction of seven (see FIG. 47). Similarly, the second black pixel (circled) from a kink site of a vertical single pixel line (left most of the two lines) shown in FIG. 48 has a direction of zero, while the pixel location to the left has a direction of one and the pixel location to the right has a direction of five (see FIG. 49). The determination of the location of the pixel with respect to the kink site is based on the gradient magnitude of the pixel location and adjacent pixel locations. For example, the gradient magnitude will always be the highest value for the first pixel location of a kink site at a non-single pixel line. Thus, the pixel values and gradient amplitudes can be compared with a template to determine whether the central pixel is the first, second, third or fourth pixel from the kink site. If desired, a backfill template can also be employed if a white pixel is not identified as the first through fourth pixel from a kink site. That is, one or more gray-scale pixels will be added to a location(s) that features a white pixel where the gradient magnitude of the pixels in the gradient direction of the current pixel is changing.

As shown in FIG. 5, it is preferable to make the decision of whether the pixel is a white or black pixel and then proceed immediately with a determination of whether the pixel is the first pixel of a kink site, before making a determination of whether the pixel is the first pixel of a single line. If the pixel does not fall into one of these two latter categories, a general decision is made as to whether the pixel is in a single line. The determination of whether the pixel is the first pixel of a single line is made using a different criteria than the criteria used for the general decision in the subsequent step in order to cover a special case where the first pixel of the kink site in a single line overlaps an adjacent pixel as shown in FIG. 55. If a criteria were used in which a change in direction were required from both sides of the pixel in order to identify a single pixel line, the case of the overlapped first pixel would not be caught.

The following are examples of comparisons that are preferably applied to the pixel values and gradient magnitudes to determine whether the central pixel is:

a) the first black pixel of a kink site (not a single pixel line) if: a15>a14 & a15>a16 & V35≠0 & V25=0 & V26=0 & V45=0 & V36≠0 & V55≠0 & ((V24≠0 V16=0 & V14≠0) or (V27≠0 & V14=0 & V16≠0));

b) the first black pixel of a kink site in a single pixel line if: (V15≠0 & (V14≠0 & V13≠0 & V16=0 & V17=0 & ((V26≠0 & V27≠0 & V24=0 V23=0) or (V36≠0 & V37≠0 & V34=0 & V33=0))) or (V16≠0 & V17≠0 & V13=0 V14=0 & ((V23≠0 & V24≠0 & V26=0 & V27=0) or (V33≠0 & V34≠0 & V36=0 & V37=0)))); and c) the first white pixel of a kink site in a single pixel line if: (V15=0 & V35≠0 & ((V13=0 & V14=0 & V16≠0 & V17≠0 & V34≠0) or (V13≠0 & V14≠0 & V16=0 & V17=0 & V36≠0)) & ((a15>a14 & a15<=a16) or (a15<=a14 & a15>a16))).

Similar criteria are used for each of the other decisions illustrated in FIG. 5. Once a match is established, an address is generated and supplied to the LUT in order to generate corresponding enhanced gray-scale data which is subsequently supplied to the gray-scale printhead of a printer or to a display. See, for example, the enhanced gray-scale data shown in FIG. 50 which corresponds to the original data shown in FIG. 12. The actual values of the enhanced gray-scale data to be utilized in place of the binary input data depends on the characteristics of the printer or display to which the enhanced data is to be supplied and a subjective determination of what is considered acceptable to the end viewers of the printed images. The original binary bitmap data is used if no match occurs.

Some basic rules, however, do apply in generating the enhanced data to be stored in the LUT. For example, looking at some kink sites in the downstroke of the letter R in the gradient magnitude map of FIG. 3 and the gradient angle map of FIG. 4, it is noted that the gradient magnitude is at a peak value right at the kink site with respect to the gradient magnitude of the pixels along the gradient direction (the gradient direction being along the tangential direction of the line). Thus, for an exposed pixel, it is desirable to reduce the exposure at that kink site to reduce jaggedness. In contrast, it is desirable to increase the exposure of the white pixel at the kink site, which also has the gradient magnitude at its peak, to reduce line jaggedness, provided that one of the pixel values along the gradient direction is not zero which signifies that the white kink site is indeed a kink site. Similar sets of rules can be written to take care of black or white pixels at a certain distance to the kink site to have a gradual line width change to reduce tangential gradient magnitude changes. It should be noted that the exposure value of the exposed and non-exposed pixels is not changed on the upper portion of the letter R, since no kink site is defined (gradient change along the gradient direction of the search turns out a similar gradient magnitude). Therefore, the normal gradient magnitude or sharpness of the letter is not reduced. Other rules can be written to take care of single pixels.

The system preferably makes use of a variable window depending on the gradient angle (or direction) change of the pixels along the gradient angle. For example, the problem of line jaggedness usually occurs at near horizontal or near vertical lines. For the case of a near horizontal line, a larger window (preferably rectangular with a long axis in the direction of the line segment) along the direction of the gradient direction can be utilized. If the gradient direction of the pixels is not changing much, a longer window is used. For 400 dpi (15.81 dots per mm), a window of about 20 pixels length in one direction is about right or 10 pixels from the original position on both sides. Then if a kink site is hit, usually signifying a large change in gradient magnitude and direction—like from an angle of 180 to 153 degree change in a near vertical case—, the current pixel location with respect to the kink site will give the LUT necessary information for the modification.

Figure 51:
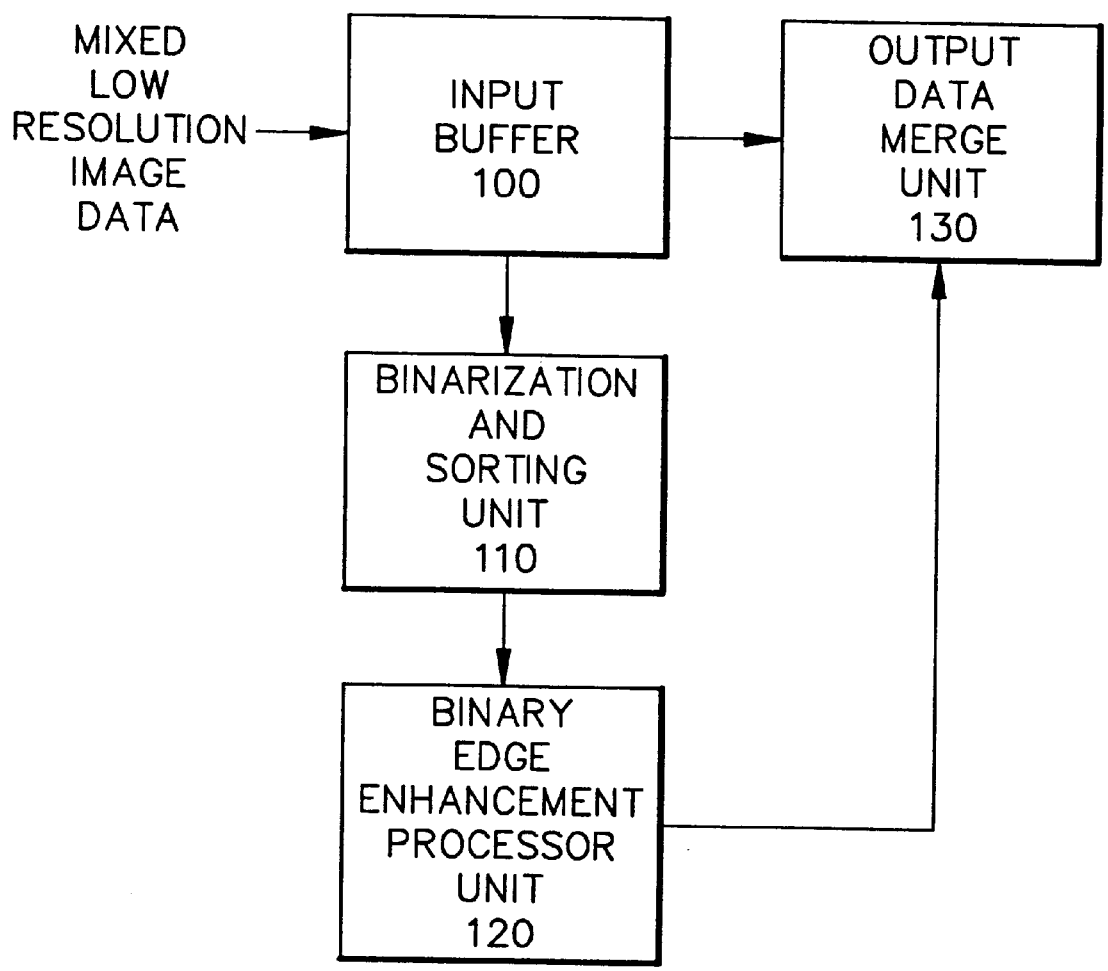
FIG. 51 is a functional block diagram of an edge enhancement processing system in accordance with the prior art.

A functional block diagram of an edge enhancement processing system for processing mixed data in accordance with another embodiment of the invention is illustrated in FIG. 51. A mixed low resolution image file, in the form of a bitmap having a plurality of pixel locations containing either gray-scale image data or binary image data, is supplied to input buffer 100. The bitmap is subsequently supplied to a binarization and sorting unit 110, which passes only sorted data that is indicative of binary image data to a binary edge enhancement processor unit 120. The binary edge enhancement processor unit 120 can be implemented with any of the previously discussed conventional binary image edge enhancement systems, but is preferably of the type shown in FIG. 1 and described above in detail. The binary edge enhancement processor unit 120 performs edge enhancement processing operations on the sorted data to produce edge enhanced sorted data that is supplied to an output data merge unit 130. The output merge unit 130 analyzes the original bitmap data supplied to the binarization and sorting unit 110 to determine whether the original bitmap data was gray-scale image data or binary image data. If the original data was gray-scale image data, the output data merger unit 130 supplies the original data from the input buffer 100 as the output of the system. If the original data, however, was binary image data, the output data merger unit 130 supplies the edge enhanced sorted data received from the binary edge enhancement processor unit 120 as the output of the system.

An example of the operation of the system will be discussed with references to FIGS. 52–54. FIG. 52 illustrates a 3×3 window of gray-scale image data supplied to the binarization and sorting unit 110. The binarization and sorting unit 110 passes only those pixel values that are indicative of binary image information, namely, a value of fifteen for an exposed pixel or a value of zero for a non-exposed pixel for the illustrated example (assuming a four bit 0–15 gray-scale), to the binary edge enhancement processor unit 120. Those pixel locations containing a gray-scale data are filled with zeros as illustrated in FIG. 53. The binary edge enhancement processor unit 120 then performs an edge enhancement processing operation on the data shown in FIG. 53. The output data merge unit 130 analyzes the original data illustrated in FIG. 52 to determine whether gray-scale information is present. A simple comparison operation, for example, can be used to compare each pixel value within the window to either zero or fifteen. If the pixel value dues not fall within this criteria, as is the case for the data illustrated in FIG. 52, the output data merge unit 130 passes the original data to the output of the system, thereby avoiding any possible distortion of the gray-scale data. In the case where the original bitmap data is binary image data, for example as shown in FIG. 54, the sorted data supplied by the binarization and sorting unit 110 to the binary edge enhancement processor unit 120 will be identical to the original data. The output data merge unit 130 will then select the edge enhanced data produced by the binary edge enhancement processor unit 120 as the output of the system.

Figure 56:
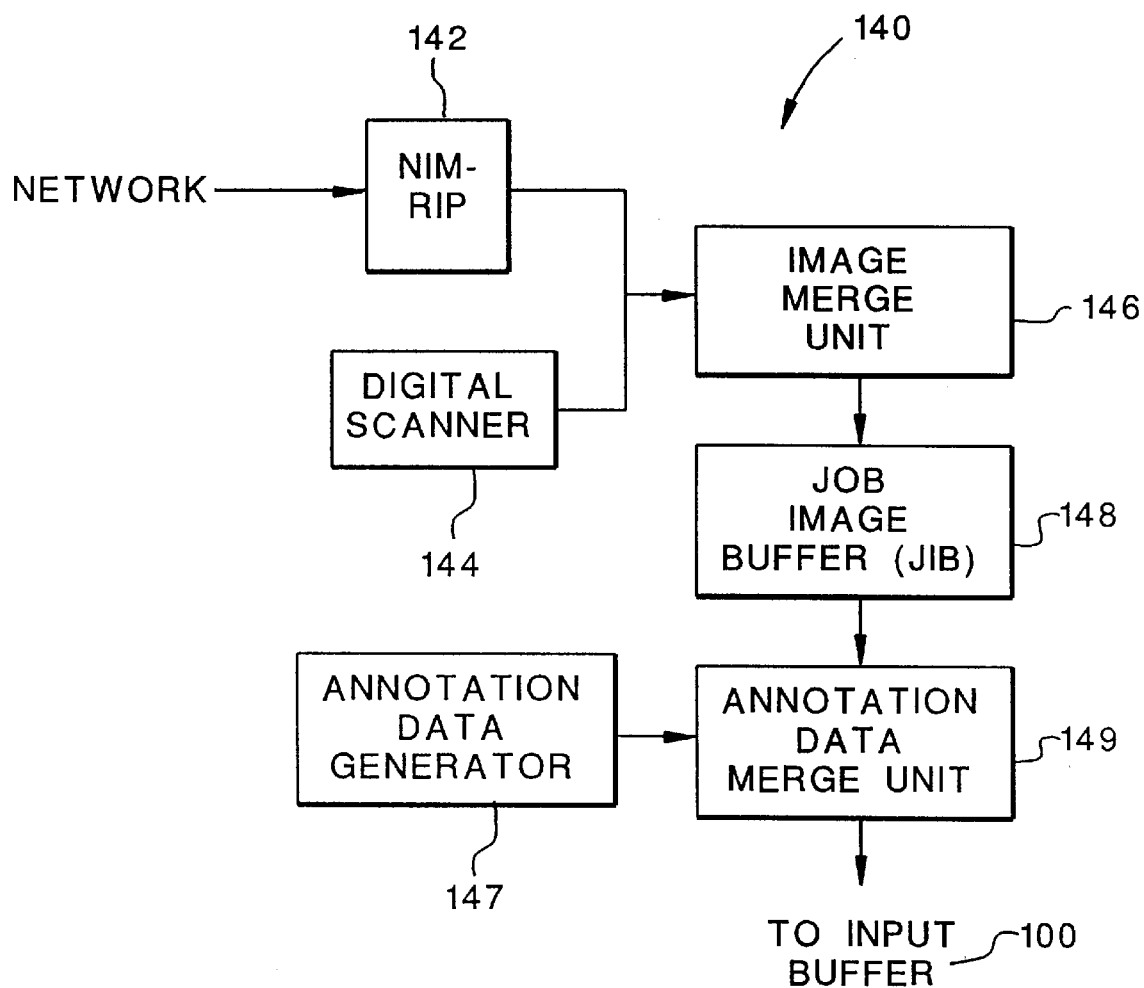
FIG. 56 is a schematic block diagram of a multiple function device that generates an image file containing mixed image data in accordance with one aspect of the invention.

The edge enhancement system illustrated in FIG. 51 is particularly useful in handling mixed data generated from a multiple function device (MFD) that generates both binary and gray-scale data. An example of a MFD 140 is illustrated in FIG. 56. The MFD 140 includes a raster image processor (RIP) 142 and a digital scanner 144 coupled to an image merge unit 146. The RIP 142 may form part of a network image manager (NIM) that receives input of data signals from external computers or document processors. The image merge unit 146 merges the output data generated from the RIP 142 and the digital scanner 146, and supplies the merged data to a job image buffer (JIB) 148 which stores image data for one or more jobs. An example of a suitable JIB is described in U.S. Pat. No. 5,384,646, the contents of which are incorporated herein by reference. In the illustrated embodiment, the MFD 140 also includes an annotation data generator 147 that permits an operator to enter annotation data (for example through a keyboard) which is then merged with the data output from JIB 148 to an annotation data merge unit 149 to generate the MPD output data.

The output data generated by the RIP 142 and the digital scanner 144 may include either digital or gray-scale data (1 bit/pixel, 2 bits/pixel, 4 bits/pixel, etc.), while the data entered from the annotation data generator 147 is usually in binary form (1 bit/pixel). Thus, the MFD output data may be either completely binary, completely gray-scale or some combination thereof. For example, assuming that the digital scanner 144 produces 4 bits/pixel gray level data and the annotation data generator 147 generates binary font data (mapped, for example, to 4 bits/pixel data where 1 takes on a value of 15 and 0 takes on a value of 0) for use as a time stamp and/or page number, the MFD output data, which is supplied as the input data stream to the system illustrated in FIG. 51, is mixture of both binary and gray-scale data. The binarization and sorting unit 110 will sort out the binary annotation data in the MFD output data from the digital scanner data, and the binary edge enhancement processor unit 120 will only modify the binary annotation data. If the digital scanner 144 produces 1 bit/pixel data, then the output data from both the digital scanner 144 and the annotation data generator 147 will be modified by the binary edge enhancement processor unit 120. Since it is desired to efficiently use memory space in the JIB 148 which may store rasterized image data in compressed form, it is desirable to store image data that is binary (i.e., represented by one bit per pixel) in the 1 bit per pixel form and transform it to decimal 0 and 15 (4 bits/pixel values) subsequent or during output from the JIB. Similar results will be obtained for all possible combinations of data output from the RIP 142 the digital scanner 146 and the annotation data generator 147. Examples of possible combinations of data from the data sources shown in FIG. 56 will now be provided.

EXAMPLE 1

In this example, the image generated by digital scanner (144), is generated by scanning document sheets and is a rendered 4 bits/pixel signal. This signal is input to the JIB (148) and compressed by a compression unit in the JIB and stored in a multipage buffer memory forming a part of the JIB. A page to be printed is read from the buffer memory and expanded back into full rasterized form. Assume further that this data now being output from the JIB is to merge with annotation data from the annotation data generator (147) which outputs a binary font for time stamp and page number. The image data from the digital scanner that went through the JIB is 4 bits/pixel gray level data. The annotation data is 1 bit/pixel data that is translated into 4 bits/pixel representation at levels 0 and 15 (4 bits/pixel binary) before merging that information with the gray level JIB output data to form the input data stream for the binary edge enhancement processor 120 that provides gray level resolution enhancement (GRET) of binary data. Now the sorter (110) in the GRET function will sort out from the merged image the 4 bits/pixel binary data and the GRET chip will provide modification to the annotation data but not the JIB data that was output by the JIB (because the latter are gray valued; i.e. gray values between 0 and 15 also appear, for example, values 1–14) before sending the GRET's output data to the output data merge unit 130 which merges the output data from the JIB that does not require enhancement because it is gray level data with the GRET processed data.

EXAMPLE 2

In this example, the NIM-RIP (142) in FIG. 56 is rasterizing a binary image file (1 bit/pixel) without any input from digital scanner 144. The 1 bit/pixel data is then compressed and stored in the JIB. If the annotation data generator 147 provides a binary input of say a day/time stamp and this is merged with the JIB output by merge unit 149 before the GRET function, both the binary output JIB value and the annotation data will transform to 4 bits/pixel (1 will take on a value of 15, 0 will take on a value of 0). Then, the GRET function will modify both the JIB image data and the annotation image data with the suggested modified gray value to reduce aliasing.

EXAMPLE 3

In this example, the digital scanner data is thresholded at 1 bit/pixel without any NIM-RIP data input. This binary information is compressed by the JIB and merged with the binary annotation image data before going to the GRET function. Both the output from the JIB and from the 1 bit/pixel annotation data will be mapped to a 4 bits/pixel signal (1 will take on a value of 15, 0 will take on a value of 0) before going to the GRET chip. The GRET chip's processor will modify both the annotation binary output and the digital scanner's binary output to gray value in order to reduce aliasing.

EXAMPLE 4

In this example, binary raster data from the NIM-RIP 142 and binary data from the digital scanner (144) are provided. Typically, binary data from a document scanner is obtained by thresholding density signals obtained from electronic scanning of the document sheets as is well known. The binary data from both the NIM-RIP 142 is merged with the binary data from the digital scanner 144 in the image merge unit 146 before compression by the JIB. The merge units may be conventional and, for example, may be a buffer wherein an input into an address of the buffer is provided by a logic operation that inputs into an address in memory using a logic operation so that data at that address is logically combined with data being read into that address. Alternatively, a logic operation may logically combine the inputs "on the fly." The combined or merged rasterized data from the NIM-RIP 142 and scanner 144 are output from the merge unit 146 and compressed and stored in a multi-page buffer in the JIB 148. All these data are binary so as to conserve storage by the JIB. The binary output from the JIB is mapped to a 4 bits/pixel value (1 is mapped to decimal 15 and 0 is mapped to 0) before the data is merged with the binary data from the annotation data generator 147 that is also binary data that is mapped to 4 bits/pixel. The combined merged data that is merged by merge unit 149 is sent to the GRET processor and the current pixel value is modified to reduce aliasing for both the data from the NIP-RIP 142, the digital scanner 144 and the annotation data generator's binary image data.

EXAMPLE 5

In this example, the NIM-RIP 142 is rendering 1 bit/pixel rasterized image data and the digital scanner 144 is outputting 4 bits/pixel gray level rendered image data. The binary NIM-RIP data is then converted to 4 bits/pixel (1 is set as decimal 15 and 0 is set as 0) still at the high speed rendering of a 1 bit/pixel RIP before image merging with the digital scanner's data in merge unit 146. Then, the JIB will need to compress the merged 4 bits/pixel data unless a region tag can be used to associate the NIM-RIP data as to where the binary data occur. If the location of the data that was originally binary can be identified, this data can be stored in the buffer in compressed form as binary data with a tag associated with pointers identifying the memory location indicating that this is binary data. Upon output from the JIB, the compressed data from the JIB is expanded to uncompressed form and if necessary, converted to 4 bits/pixel binary form and is now merged with the 1 bit/pixel time stamp from the annotation data generator that is also mapped to 4 bits/pixel before going to the GRET processor. The GRET chip's sorter will be able to sort out and enhance only the NIM-RIP data annotation generator's data without modifying the digital scanner's input gray data. In operation of the sorter, a window of pixels may be examined and if all the pixels in the window are binary (i.e., 0 or 15) then the central pixel or current pixel of interest is processed for GRET.

In the above examples, while binary data from any of the sources was indicated as being combined with other binary data from another source, the merge units 146 and 149 are adapted to also accept in response to control signals separate jobs from any of these data generating units so that a job from one unit may be printed with GRET enhancement (when the job is a binary input) without merger with another job.

In all of the above examples, it is assumed that the output data file generated by the output data merge unit 130 is supplied to a printing device having the same resolution as the device generating the input data file. The invention, however, can be utilized to enhance low resolution data (for example a 300 dpi file) that is to be supplied to a higher resolution printing device (for example a 600 dpi printer). In particular, the pixel gradient direction, pixel gradient magnitude or amplitude and pixel value data of a current and surrounding pixels can be used to select a corrected output pixel arrangement for a higher resolution printer for each input pixel from a modification value LUT.

Figure 57:
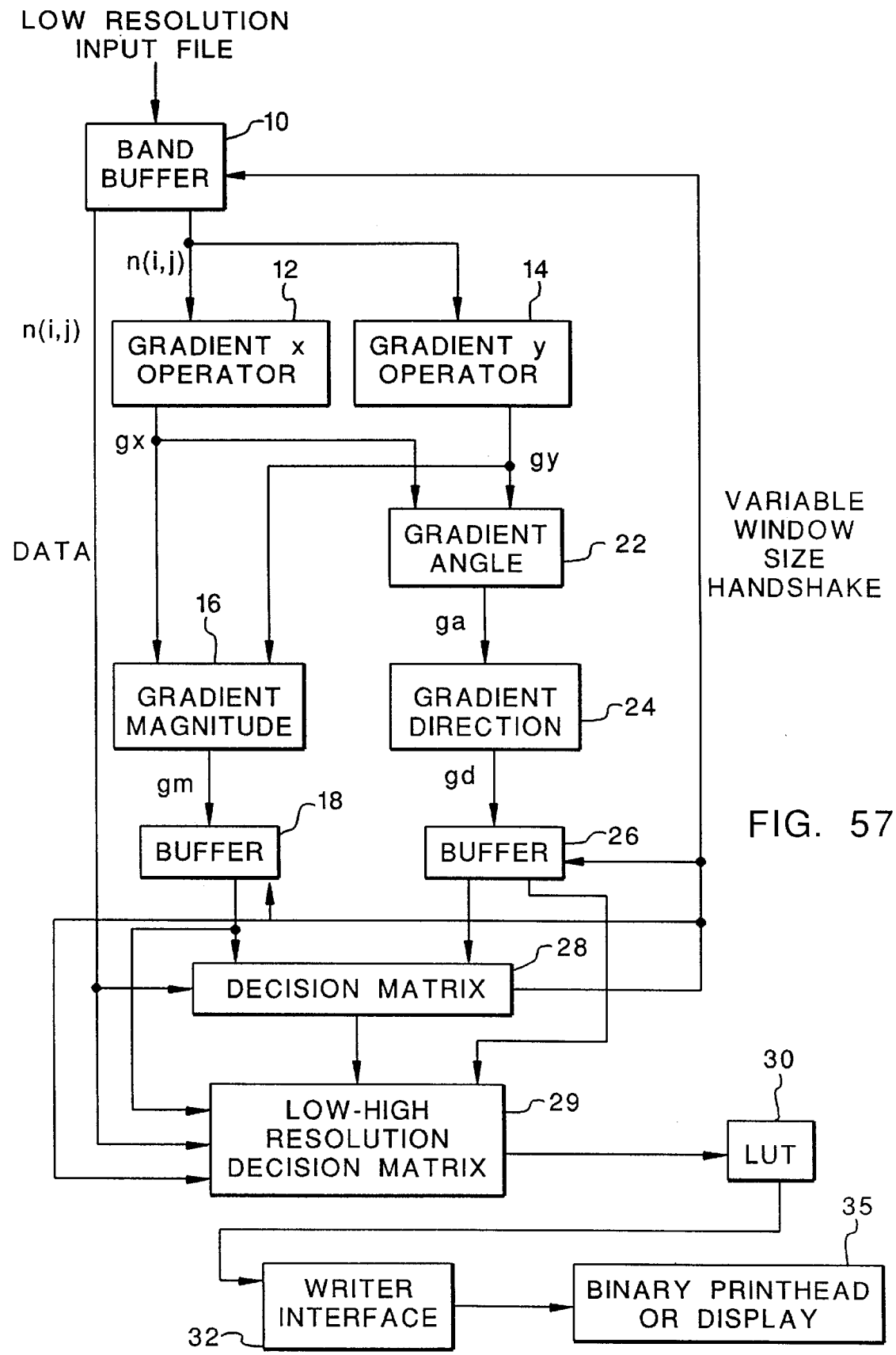
FIG. 57 is a schematic block diagram of a further embodiment of the invention that features a binary low-high resolution edge enhancement system (LHRET)
Figure 58:
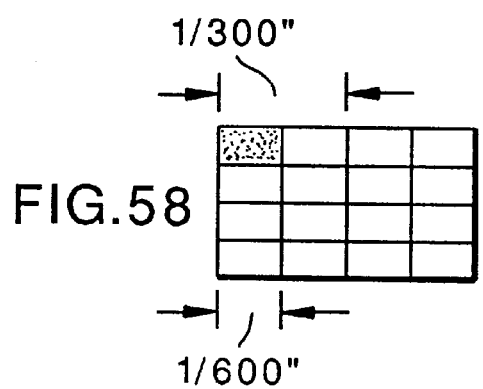
FIGS. 58–61 illustrate examples of possible pixel arrangements for a high resolution output image file.
Figure 59:
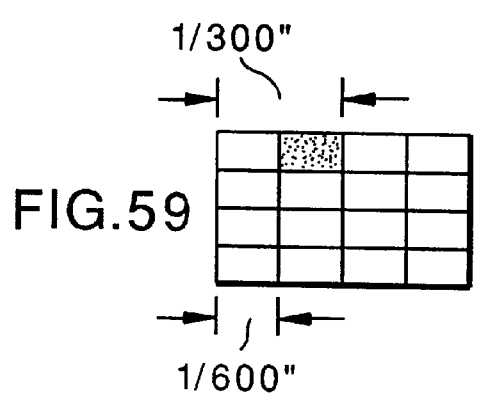
Figure 60:
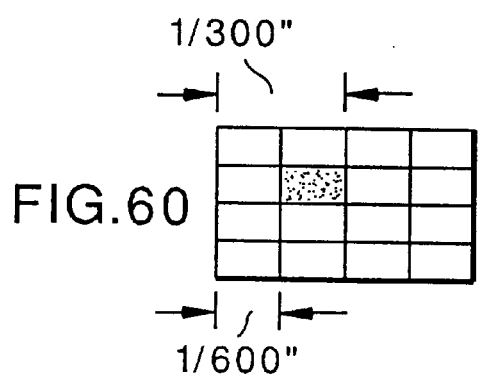
Figure 61:
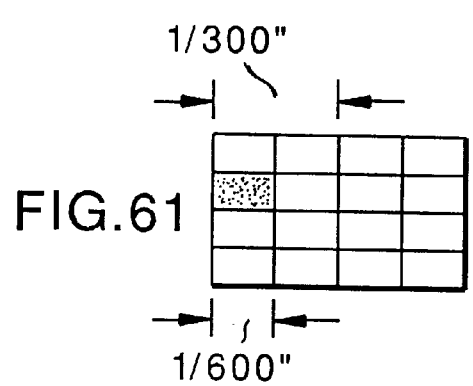

FIG. 57 illustrates a modification of the system shown in FIG. 1 which is capable of generating enhanced higher resolution data from a relatively low resolution input file.

Items in FIG. 57 designated by the same numbers as those in FIG. 1 have similar operational functions. The modified system includes a low-high decision matrix 29 coupled to the output of the decision matrix 28, band buffer 10, and the gradient magnitude and direction buffers 18, 26. The output of the low-high resolution decision matrix 29 is used to address the LUT 30, which in this case includes the output pixel arrangements for a high resolution binary printer or display 35 via a suitable writer interface 32.

For example, in the case of a second white pixel next to the edge of a black kink site, it may be desirable to have one out of four corresponding 600 dpi pixels turned on in any one of the four arrangements illustrated in FIG. 58–61. The decision matrix 29 utilizes the current pixel gradient direction, the neighborhood pixels values and gradient amplitudes, as shown in Table 1, to select an LUT address corresponding to one of the four arrangements to minimize jaggedness and preserve image sharpness.

TABLE 1

| Current gradient dir d15 | template compare 1 a14 >= a16 | template compare 2 a14 <= a16 | Output pixels arrangement number |
|---|---|---|---|
| 2 | N/A | N/A | 3 |
| 4 | N/A | N/A | 4 |
| 6 | N/A | N/A | 1 |
| 8 | N/A | N/A | 2 |
| 1 | Yes | N/A | 2 |
| 1 | N/A | Yes | 3 |
| 3 | Yes | N/A | 3 |
| 3 | N/A | Yes | 4 |
| 5 | Yes | N/A | 1 |
| 5 | N/A | Yes | 4 |
| 7 | Yes | N/a | 2 |
| 7 | N/A | Yes | 1 |

Figure 62:
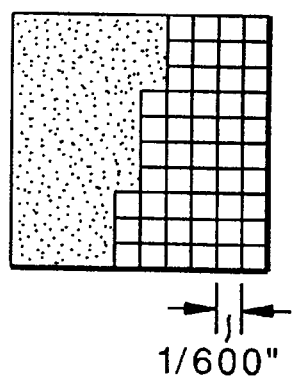
FIGS. 62 and 63 illustrate respectively a 600 dpi output image generated from a 300 dpi input image using the embodiment illustrated in FIG. 57.
Figure 63:
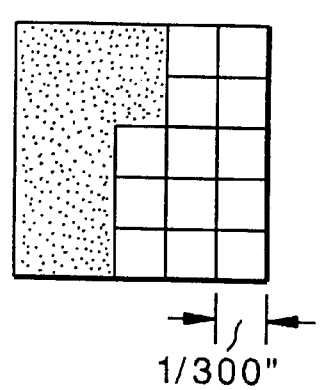

In Table 1, a14, a15, and a16 are gradient amplitudes as shown in FIGS. 22–45 and d15 is the current pixel direction. FIG. 62 illustrates an example of a 600 dpi image generated from a 300 dpi image shown in FIG. 63.

Figure 64:
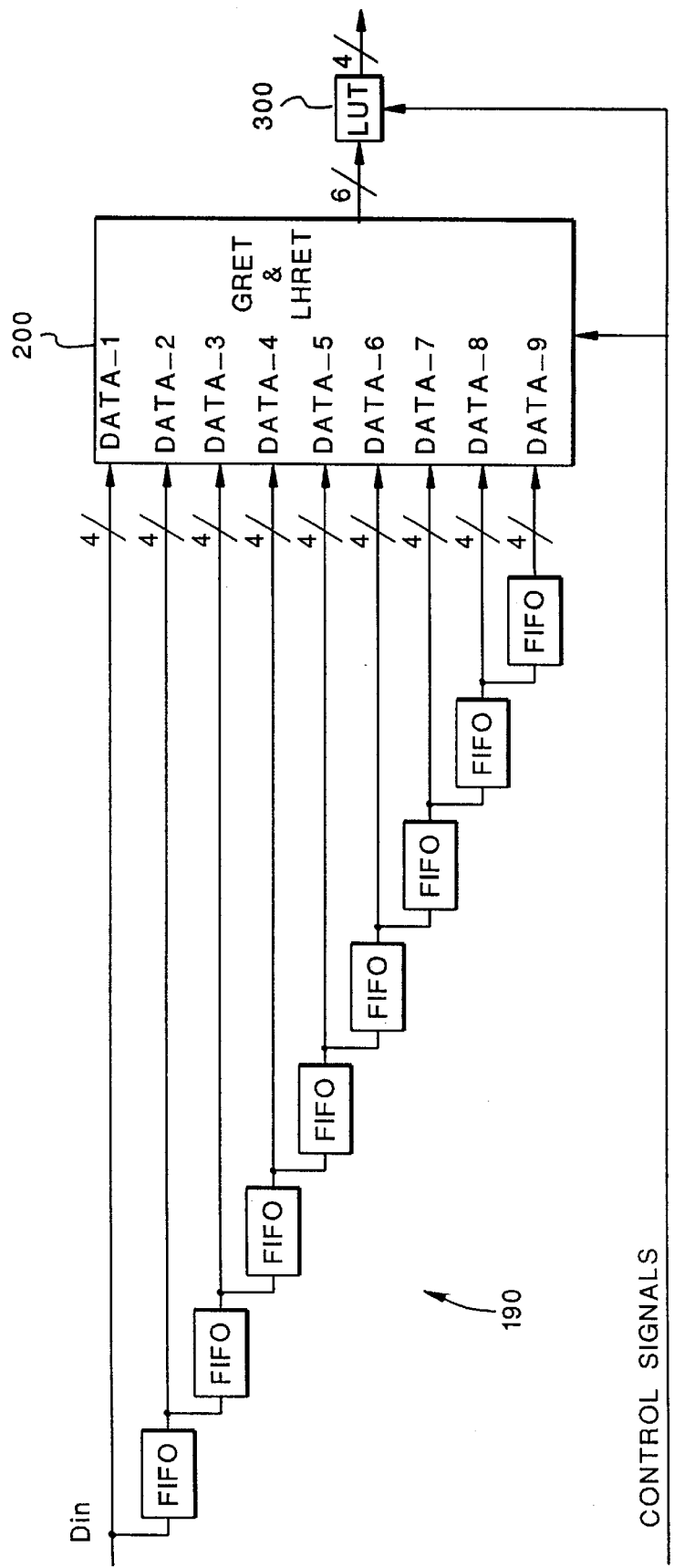
FIGS. 64–66 is a schematic block diagram of another embodiment of the invention featuring a combined GRET and LHRET system.
Figure 65:
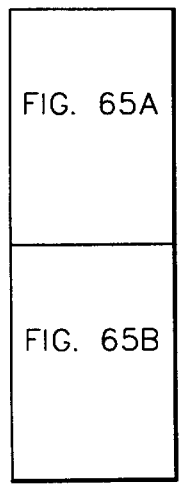
Figure 65A:
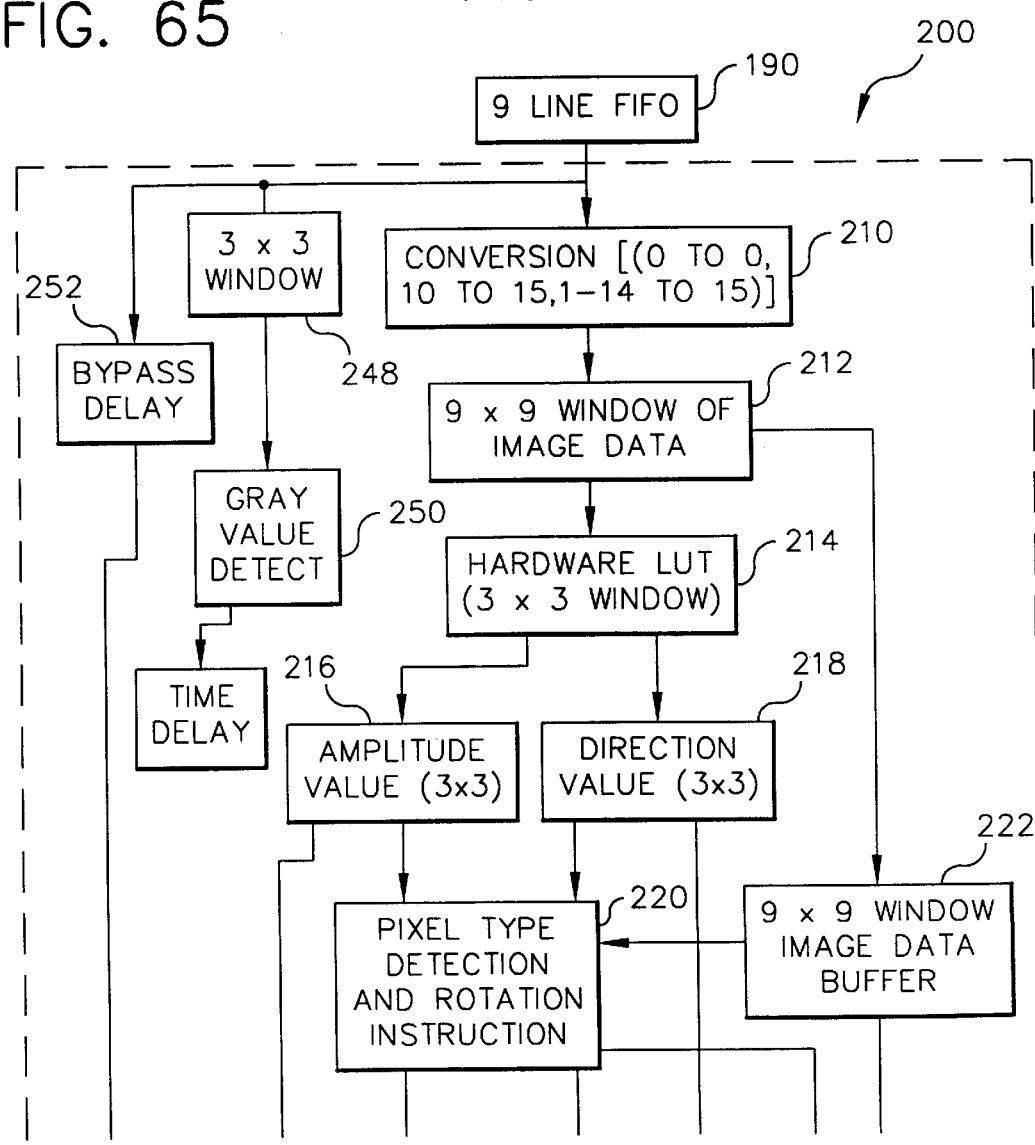
Figure 65B:
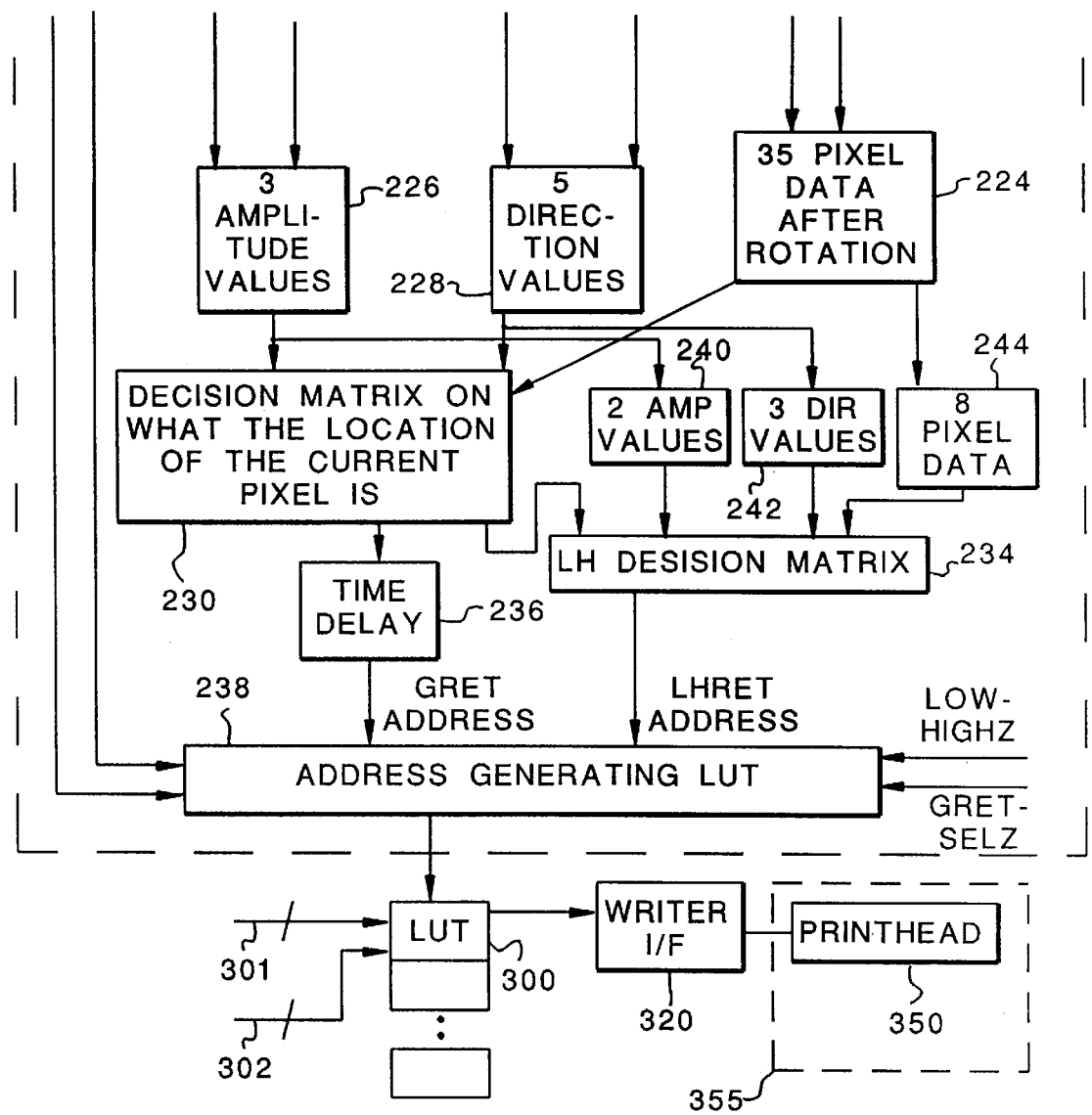
Figure 66:
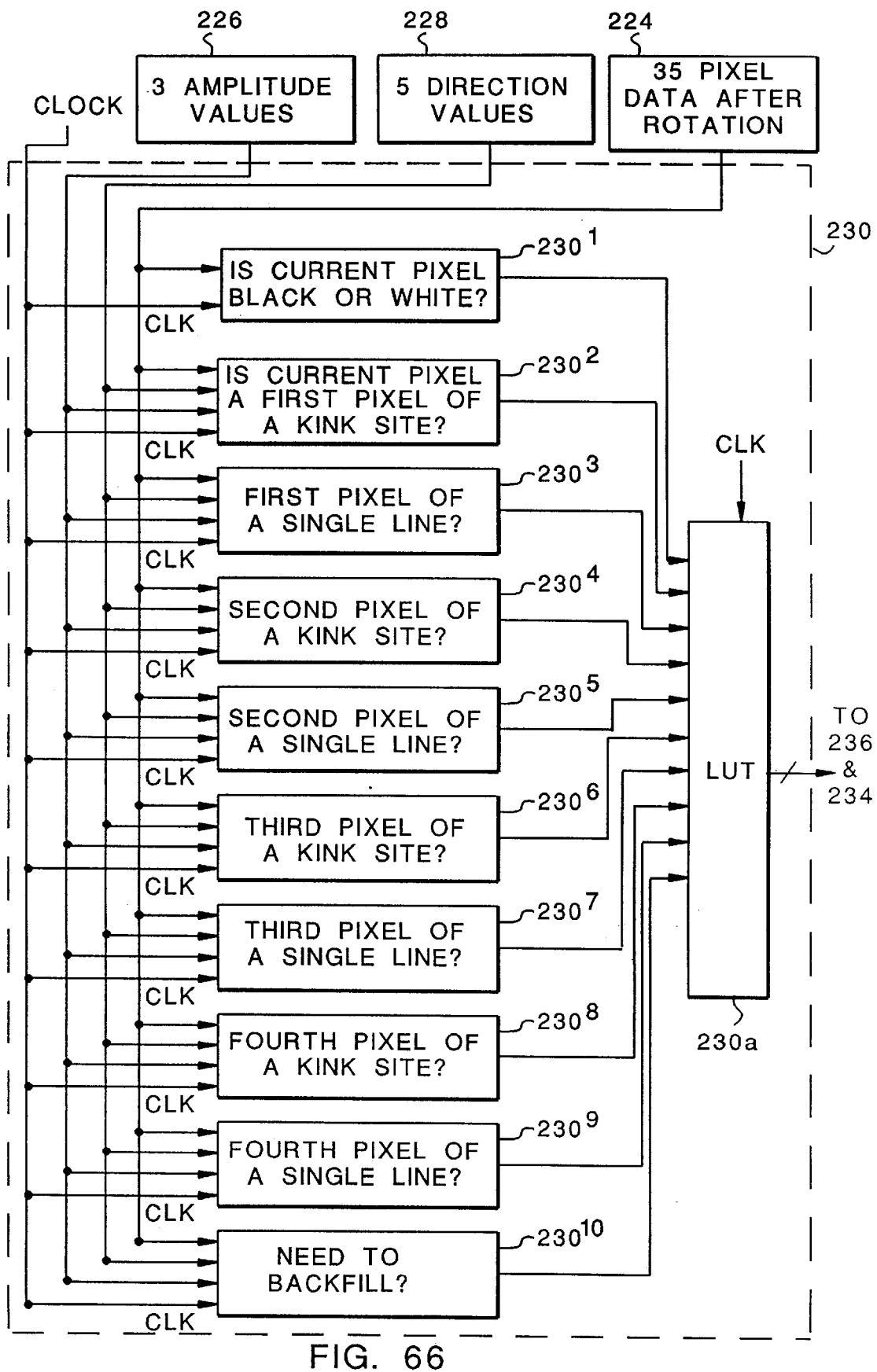

With reference now to FIGS. 64, 65 and 66, there is shown an improved resolution enhancement (RET) circuit 200 in block diagram form that is selectively operative to convert incoming low resolution binary image data to gray level resolution enhanced (GRET) data of the same resolution or to enhance low resolution binary data by converting same to binary data at a higher resolution (low to high resolution enhancement (LHRET). In a preferred embodiment, a combined GRET and LHRET circuit 200 is implemented in an application specific integrated circuit chip (ASIC). In operation a FIFO buffer 190 stores nine lines of image data; i.e., eight lines are stored and the ninth line of data is currently input. Because the data may be a mixture of binary and gray level data, the gray level data is binarized to one of two pixel values. Data from the FIFO and the current line of data are input to the circuit 200 and, in effect, are binarized in binarizer block 210 for example through assignment of binary "0" to each pixel having a gray level of "0" and a binary value 15 to each gray level pixel that has gray level value of 1–15 assuming the input image data in this example has its gray level pixel data represented by a 4-bits per pixel bit depth. Alternatively and preferably, the data can be binarized to binary values 0 and 1. The binarization process may be modified to provide some threshold value for determining which pixel values get binarized as binary 0 and which as binary 1. This may reduce the affects of noise on the binarization process and possibly reduce errors. After binarization of the data, the data is buffered in a 9×9 window buffer 212. For each pixel, a block or sub-window of 3×3 surrounding pixels including the current pixel of interest in the center are examined by having their respective pixel values (0 or 15) used as an input address to a hardware look-up table (LUT) 214. Look-up table 214 is preferably a group of three parallel gradient amplitude look-up tables and three parallel gradient direction look-up tables that are accessed simultaneously by respective 3×3 subwindows of image data from buffer 212 to provide gradient amplitude and direction values for the current pixel of interest and two neighboring pixels in the same column as the current pixel of interest. The 3×3 sub-windows are used to determine a gradient amplitude value and gradient direction value from the LUTs 214 for the current pixel and the two neighboring pixels. Thus, a gradient amplitude value and a gradient direction value for each of a column of three pixels in the 3×3 sub-window are generated and are stored in 3×3 buffers 216 and 218, respectively. Gradient amplitude and gradient direction values for the other pixels in the 3×3 subwindow may be stored from previous operations in buffers 216, 218 to provide the 3×3 matrices of gradient amplitude values in buffer 216 and of gradient direction values in buffer 218.

The gradient amplitude and gradient direction values stored in buffers 216, 218 respectively and the 9×9 window of image data used to generate these values are input to a logic circuit 220 which determines as described above rotation instruction for rotating the pixel data in the 9×9 window so that fewer template matchings are required. While operating on rotation of the current 9×9 window, the current 9×9 window may be stored in a buffer 222 so that a new 9×9 window of image data can be created by addition of a new column of pixels to the window of pixels stored in buffer 212 thereby creating a new current pixel of interest. After a rotation instruction for the current window stored in buffer 222 is generated by logic circuit 220 up to 35 pixels in a rotated window are necessary while other pixels have values that are not needed; i.e., "don't cares". The binary data for the 35 necessary pixels from the 9×9 window in buffer 222 including the current pixel are output to and stored in a buffer 224. Similarly, no more than a certain three gradient amplitude values may be necessary and no more than a certain five gradient direction values may be necessary from the respective values stored in buffers 216, 218. These necessary values are stored respectively in buffers 226 and 228. Examples of selecting the necessary values are described above in the various illustrative examples. The next part of the circuit 200 is a decision matrix block or logic circuit 230 which determines whether or not the current pixel under consideration is a black pixel or a white pixel and the location of the pixel either as being on a single line or its location vis-à-vis a kink site. With reference to FIG. 66, it may be seen that an improved feature of circuit 200 is the provision in decision matrix block 230 of having most of the logic operations for determining current pixel location being performed simultaneously with their respective outputs serving as an address to a LUT 230a. In accordance with this approach, an addressing scheme is provided that gives greater weight to decisions that are affirmative as to a pixel being a first pixel from a kinksite or a first pixel of a single line over that of a second pixel, and greater weight to the second pixel over a third pixel, and the third pixel over the fourth pixel. For example, if the current pixel is a white pixel and is a second pixel on a line segment from one end of a line and also a third pixel on a line segment as viewed from the other end of the line, priority is given to identifying this pixel as a second pixel on a line segment because the status of being a second pixel is given more weight than being a third pixel from an end of a line or a kinksite. Thus, there is input to LUT 230a forming part of the decision matrix block 230 the following logical decisions:

Is the current pixel black or white ($230^1$)? The input into this logic need only be the value of the current pixel of interest (since all pixels not being bypassed are binarized to 0 or 15 (or 1) values).

Is the current pixel a first pixel of a kink site ($230^2$)?. The input into this logic decision block as well as the remaining others are the 35 pixel data black after rotation (224), the 5 gradient direction values (228) and the three gradient amplitude values (226).

Is the current pixel a first pixel of a single line ($230^3$)?

Is the current pixel a second pixel of a kink site ($230^4$)?

Is the current pixel a second pixel of a single line ($230^5$)?

Is the current pixel a third pixel of a kink site line ($230^6$)?

Is the current pixel a third pixel of a single line ($230^7$)?

Is the current pixel a fourth pixel of a kink site ($230^8$)?

Is the current pixel a fourth pixel of a single line ($230^9$)?

Does the current pixel require a backfill ($230^{10}$)?

The yes or no binary decisions are output simultaneously by each of these decision blocks under clock control from a marking engine controller to the LUT 230a. In LUT 230a, values are stored relative to the identity of the pixel based on the questions answered by the decision blocks $230^1$–$230^{10}$. The addresses of the values stored in LUT 230a are such as noted above to provide greater weight to decisions indicating closeness to a kink site or to an end of a line.

Since all of the decision blocks provide a part of the address to the LUT 230a and all of the decisions are rendered simultaneously, a meaningful number of clock cycles are saved over a multi-step process where a decision is made at one level and then cascaded to the next level.

After a decision is made as to the location of the current pixel, the output decision of LUT 230a is provided to time delay block 236 to time-wise align it with the output of an LH decision matrix block 234. As noted above, the circuit 200 has the capability to provide resolution enhanced image data at a resolution higher than that input for operation with a binary printer (LHRET mode) or to provide resolution enhanced output for a gray level printer that prints at the same resolution of the incoming data but enhances binary pixel data with certain gray level pixels; i.e. grey level resolution enhancement (GRET mode). A two-bit signal is provided by an external device, external to the chip 200, that identifies the type of operation to be performed by the circuit 200; i.e., low-high resolution enhancement (LOW-HIGH Z) or grey level resolution enhancement (GRET-SELZ) or by-pass mode. This could be provided by an operator "keying" in the type of printer or provided automatically in response to a coded instruction associated with the printhead. In the case where GRET operation is "keyed in" or selected, the time delay is provided by a buffer 236 which stores the output of decision matrix 230 for one clock cycle and thereafter the location address of the current pixel is input as an address input to an address generating LUT 238. The address generating LUT receives this address input and a signal indicating GRET mode is operative and is programmed to generate an output signal that is itself an address input to a LUT 300 that is external to the ASIC 200 and is programmable. The reason for the two step LUT approach; i.e., two LUTs 238 and 300 is to provide flexibility in operating modes but with the LUT in the ASIC not being programmable. If desired, both LUTs 238 and 300 can be integrated into a single LUT. The features of the GRET are described above.

LUT 300 is programmed to receive the output of address generating LUT 238 to provide gray level enhancement values suited for the particular output device which may be a printer or display. LUT 300 may be a multiple LUT wherein each table stores data for a particular color to be printed by printhead 350 forming a part of marking engine 355 which may be a black and white monocolor or multi-color electrostatographic recording apparatus or other type of non-impact printer such as inkjet, thermal recorder, etc. As process conditions or the tone reproduction curves (TRC) in the marking engine change, LUT 300 may be reloaded with new data over lines 302 by controls from the marking engine. In the case of a multiple color printer, a signal representing color may be provided on line 301 to identify the table to be used for that color.

If the circuit 200 is operating in the LHRET mode, gradient amplitude values stored in a buffer 240, gradient direction values stored in a buffer 242 and pixel data stored in a buffer 244 are output to a low to high decision matrix logic set 234. While blocks 240, 242 and 244 are identified as buffers they could and preferably are hard-wired outputs of portions of respective buffers 226, 228 and 224. Thus, the more important values stored in buffers 226, 228 and 224, respectively, may be input directly to the LH decision matrix 234. Also input to the LH decision matrix is the output of decision matrix 230 which provides a signal indicating the location of the current pixel vis-à-vis the end of a line or a kink site. The LH decision matrix 234 is a logic device or it may be a LUT which provides at its output an address into the address generating LUT 238. The LH decision matrix 234 in response to the decision by decision matrix 230 and the values from blocks 240, 242, 244 determines from which side the current pixel may be part of an edge. Since the LHRET mode is used to transform a single binary pixel into four pixels (2×2 matrix) at the higher resolution with resolution enhancement the LH decision matrix 234 uses the location decision of decision matrix 230 and the other noted inputs to determine whether to, for example, favor adding preferentially along the left side of the 2×2 matrix, the upper side, the right side or the bottom side. Thus, if the data input to matrix 234 suggests that an edge is located to the left of the current pixel, the LHRET output address that is input to LUT 238 will be coded to emphasize creation of high resolution binary pixels along the left edge of the 2×2 matrix. Note that the 2×2 matrix has $2^4$ or 16 possible configurations so 16 addresses are possible outputs from matrix 234 to LUT 238. With reference also now to Table 2, examples are provided of input addresses and output addresses for the address-generating LUT 238 in its various operating modes.

In another mode of operation of the circuit 200, a bypass mode is provided wherein low resolution gray level image data is to be printed as is and not enhanced. This mode may be set or selected by the operator as described above through an input to LUT 238 or may be automatically set by image processing devices upstream or as described below determined to be selected automatically by the circuit 200. The circuit 200 includes a buffer 248 or direct logic input of a 3×3 window of 1-bit flags concerning the pixels about (and including) the central pixel, which implies the current pixel of interest. This 3×3 window of flags identifies grey level data output by the FIFO 190 before binarization. Thus, if there is any grey level data (grey values 1–14) in a 3×3 window about the current pixel, it will set an appropriate flag. If within this 3×3 flag window, a flag indicating a grey level pixel is found (i.e., data for a corresponding pixel having a gray value of 1–14) the current pixel is determined to be part of a segment of gray level data and the current pixel is not to be enhanced. The detector 250 is a logic circuit and examines the 3×3 window of flags in buffer 248 and provides this determination and its decision is communicated by a signal after a time delay to the address generating LUT 238. Block 252 is a by-pass delay device which provides the original 4-bit grey level pixel value of the current pixel to the address-generating LUT 238 when the chip 200 is being operated in the by-pass mode or when a flag indicating grey value pixel is present in the 3×3 window surrounding the current pixel of interest and is detected by the detector 250. As shown in Table 2, where the bypass mode is selected the current pixel gray value is input as a respective value input address value 0–15. In this example, the output address of LUT 238 matches that of the input as a direct map but such is merely discretionary.

Another bypass mode is one wherein resolution of an incoming binary current pixel is to be output with increased resolution but without resolution enhancement. Thus, simply, a binary pixel of gray level 0 at 300 dpi is to be output as a set of 4 binary pixels at 600 dpi and each at gray level 0. A binary pixel of gray level 15 (or 1) at 300 dpi is to be output as 4 binary pixels at 600 dpi and each at gray level 15 (or 1).

Because the address output of LUT 238 is input to LUT 300, there will be stored at addresses in LUT 300 a suitable corresponding value for the current pixel that is bypassed. Thus, for the low resolution bypass mode the output from LUT 300 will be a value from 0–15 and correspond to the gray value of the input pixel. In the case of Low to High (LH) resolution bypass the output of LUT 300 will correspond to the low resolution input pixel except that four binary pixels at 600 dpi resolution are output. Since values for these four pixels are output simultaneously but not printed simultaneously a writer interface 320 can be provided to store several lines of data waiting to be sent to printhead 350. For gray level printheads there may be required correction of the data for nonuniformity, such as with use of LED printheads made in accordance with techniques described in commonly assigned U.S. Pat. No. 5,300,960 and U.S. application Ser. Nos. 08/579,749 and 08/581,025. Where the printhead is a binary printhead operating at the high resolution such as a binary LED printhead, the image data is not corrected but is buffered so that data is output in the correct order for output to the registers on the printhead in the correct order for each line to be recorded. Details regarding writer or display interfaces and printheads or displays are well known to those of ordinary skill in the art; for example, see U.S. Pat. Nos. 4,750,010 and 4,882,686 as examples of binary architectured printheads and interfaces therefore, and U.S. Pat. No. 4,746,941, as an example of a gray level printhead and interface therefor. Additional description is also provided below.

Figure 67:
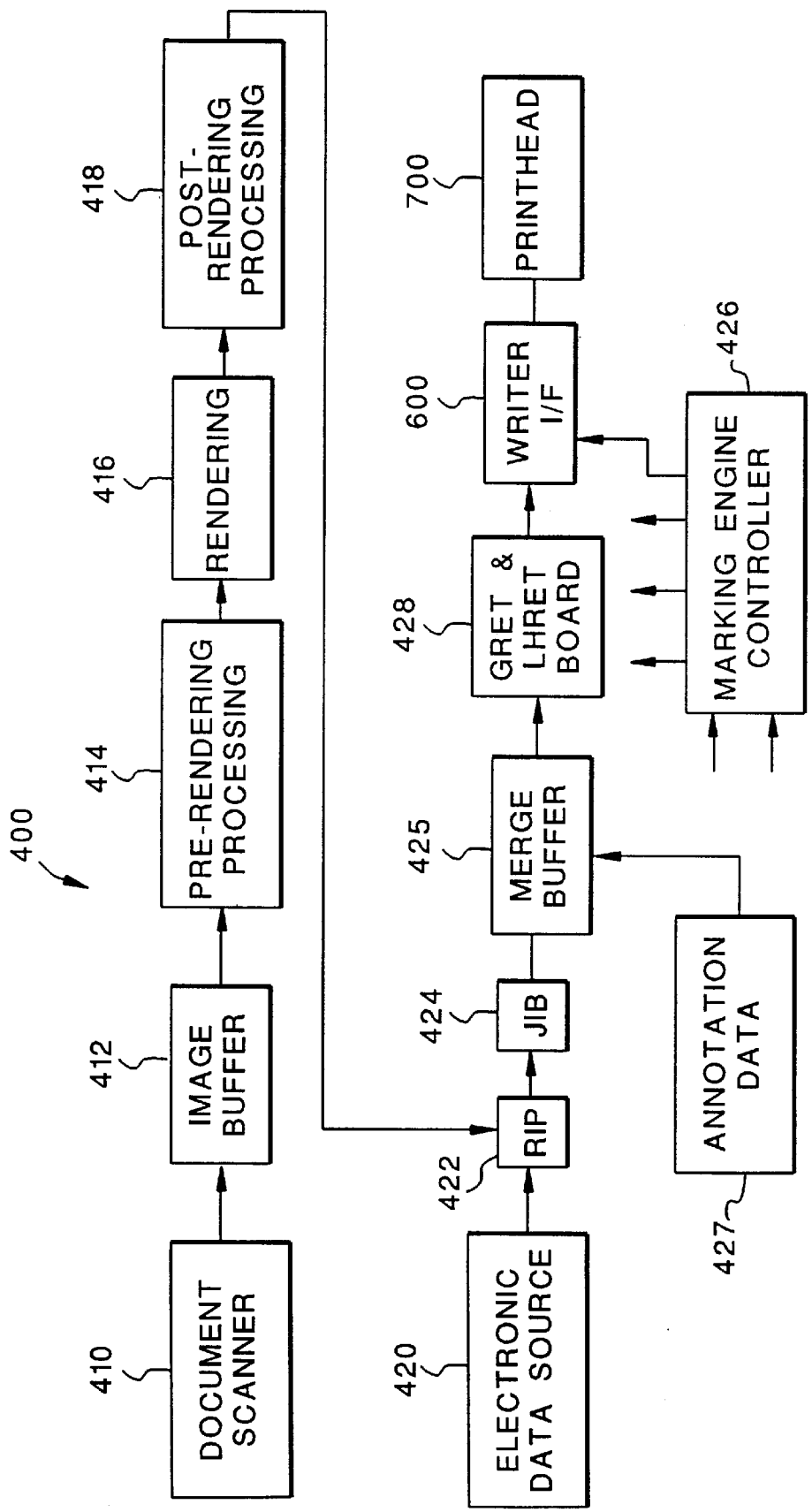
FIGS. 67–69 is a schematic of yet another aspect of the invention wherein plural channels of combined GRET and LHRET devices are used in a printer.
Figure 68:
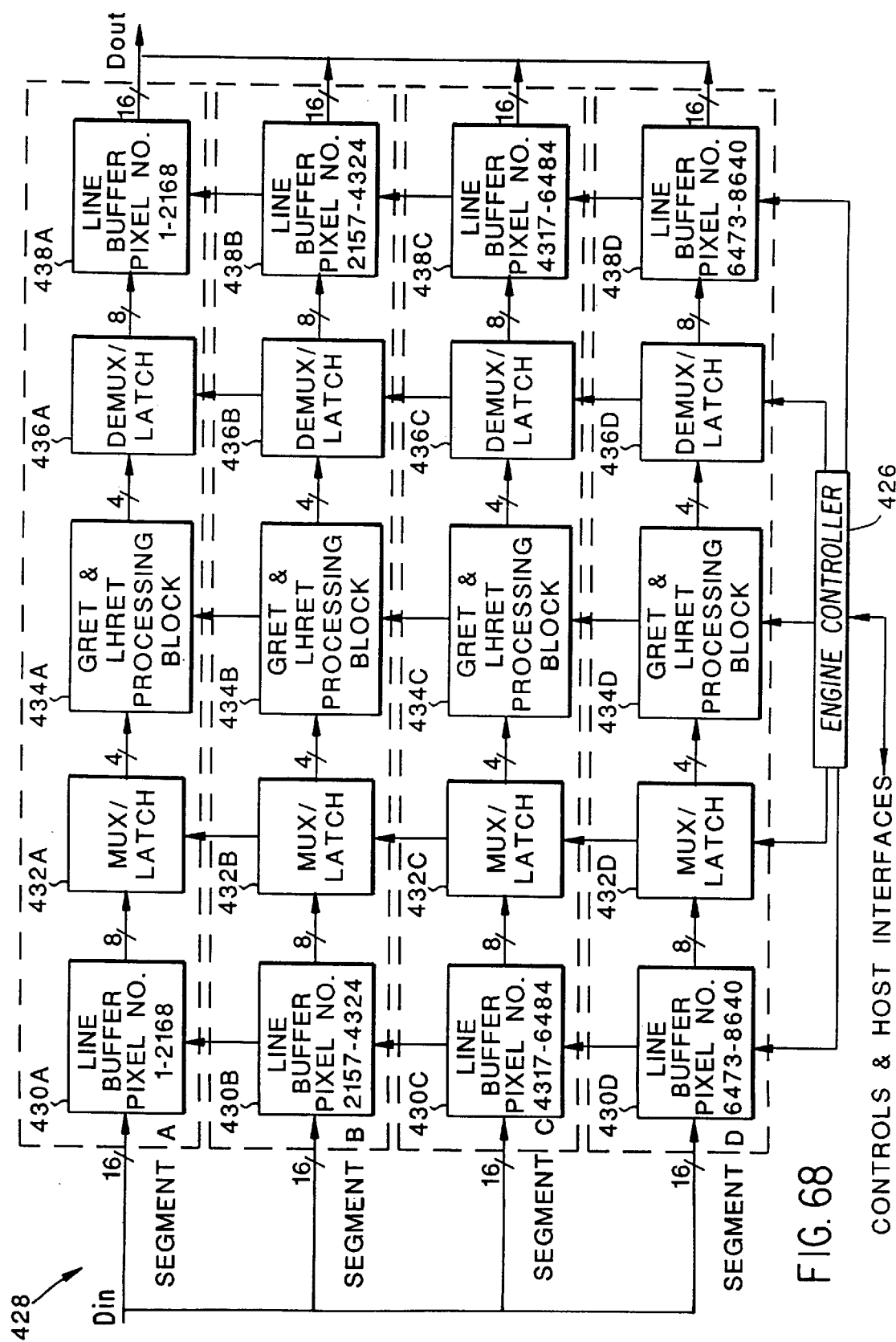
Figure 69:
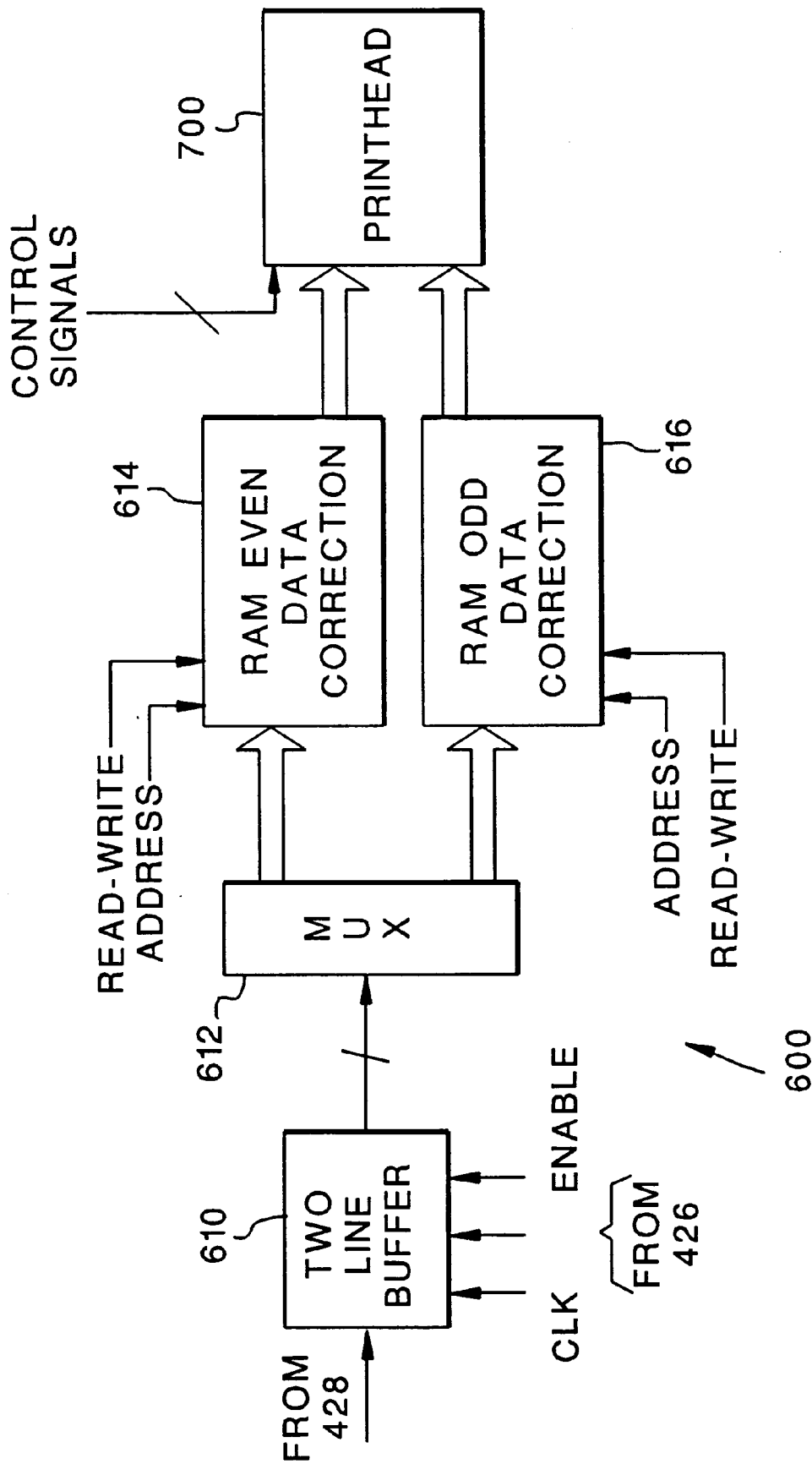

In accordance with another aspect of the invention, and with reference to FIGS. 67–69, there is a GRET and LHRET board 428 provided having a plural number of combined GRET and LHRET circuit chips 200 operating in parallel so that four current or central pixels may be examined concurrently or simultaneously and a gray level enhanced pixel (or higher resolution pixels) generated therefor in accordance with the teachings herein of operation of a single combined GRET and LHRET chip. The simultaneous use of four combined GRET and LHRET chips 200 allows for four times faster processing time of each line of data. In the embodiment illustrated in FIG. 67, a reproduction apparatus 400 includes a document scanner 410 which is provided for scanning a document electronically. Image data scanned from the document is stored in an image buffer 412. Data from the buffer is subject to pre-rendering processing in a processor 414 such as filtering, formatting and/or color manipulation for color recording if required. The processed data is then rendered to binary pixel data by being subjected to thresholding in a rendering circuit 416. The binarized pixel data may be also subject to post-rendering processing in a circuit 418. The binary data is compressed in a job image buffer (JIB) 424 and stored in compressed form and when required for printing output to an expansion or decompression processor forming a part of JIB 424. A computerized marking engine controller 426 is programmed to control the various circuit processors in apparatus 400. When a line of image pixels on a page is to be output from the JIB the data is expanded and stored in a merger buffer 425.

The merge buffer 425 serves as a buffer interface to the GRET and LHRET board that supports four combined GRET and LHRET processing blocks (see FIG. 68) wherein each processing block is similar to that shown in FIGS. 64–66 and includes a nine line FIFO (actually eight lines+ current line as a direct input) and combined GRET and LHRET circuit. In addition, the merge buffer allows for annotation data to be merged with page data output from the JIB to provide page numbers or other annotation data to each or selected pages of data. Annotation data may be stored in a board 427 featuring data storage ROMs or other memory chips or may be generated using software and/or by a RIP as is well known. Data is output from the merge buffer 425 in 16-bit size words representing four pixels, each pixel having a 4-bit per pixel bit depth dimension or size. The 16-bit size words are output from buffer 425 under clock control of marking engine controller 426. The controller 426 also provides enable signals to line buffers 430A, B, C and D to enable latching of data. The enablement signals to the line buffers are such to divide each raster line of image data in the mainscan or fastscan direction and represented by 8640 pixels into four segments or channels A, B, C and D. With reference to Table 3 and FIG. 68, it may be seen that segment A comprises, in this example, pixels 1 through 2168, segment B comprises pixels 2157 through 4324, segment C comprises pixels 4317 through 6484 and segment D comprises pixels 6473 through 8640. Note that there is provided an overlap in some pixels between the segments. After storage of a line of pixels in line buffers 430 A–D, in each channel data for 2 pixels (8 bits) are output to a respective Mux/Latch 432 A–D associated, respectively, each with a respective line buffer 430 A–D. The Mux/Latch allows data for one pixel to pass to the respective GRET and LHRET block 434 A–D while latching the data for the second pixel. The data for the second pixel is then passed to the GRET and LHRET block before a next 8-bit input is provided to the Mux/Latch. The input of the pixels to the GRET and LHRET blocks are first to respective FIFO buffers similar to that shown in FIG. 64. In this case, the FIFOs each store 9 lines of respective segments; i.e., for each of 9 lines, a FIFO buffer stores data for 2168 pixels. If only binary data is to be stored in the JIB or output to the FIFO, then the data for each pixel may be stored as a binary bit and then converted to a 4-bits/pixel value for resolution enhancement processing by the GRET board 428. However, if grey level data is to be input into the FIFO or stored in the JIB, then any binary data can be converted to say a 4-bit value of decimal 0 or 15. In this example, grey level data and/or binary data may be input from an electronic data source 420 which may be a computer, data storage device or network. The electronic data is rasterized by raster image processor (RIP) 422 and input to the JIB 424. The JIB may store multiple pages of image data for use in making plural copies of a multiple page document through electronic recirculation of data as is known. With reference again also to Table 3, it may be seen that while pixels 1 through 2168 of a line Segment A are input to a nine line FIFO and then to a combined GRET and LHRET chip (which is similar in architecture to chip 200 of FIG. 65), pixels 1 through 4 will not be processed for enhancement but sent via the bypass to the Address Generating LUT 238. Thus, for line Segment A pixels 1 through 4 are not enhanced by GRET processing but output from the LUT for Segment A with its original binary or gray level values. Pixels 5 through 2164 are subject to possible gray level enhancement processing in accordance with the processing techniques described above for GRET circuit 200. Pixels 2165 through 2168 in Segment A are also subject to bypass processing and when output from the LUT 300 for Segment A to the writer interface are discarded. In the last column of Table 3, there is shown the pixels of each line segment that are actually used for recording data. In the case of Segment B, it may be seen that the first four pixels and the last four pixels of the Segment B are not actually used for output to the printer. The same is also true for Segment C data input. For Segment D data, it is the first eight pixels that are input into line buffer 430 that are not output for printing; i.e., they are discarded.

After a bypassed pixel or a processed pixel data is output from a respective GRET and LHRET processing block 434 A–D as a 4-bits per pixel value, the data is stored in a respective demultiplexer/latch 436A B, C and D. When data for two pixels are latched, an 8-bit signal representing this data is output to a respective line buffer 438A, B, C and D.

With reference also now to FIG. 69, data from the line buffers 438 A–D are read out in 16-bit size words representing data for four pixels and input into a multiline buffer 610 which allows storage of preferably at least two lines of data so that for high speed printing data for one of the lines can be simultaneously read out from the buffer while data for the next line is being input into the buffer. In inputting data into the buffer 610, a signal on an enable line from the marking engine controller 426 is so controlled in accordance with a program in the controller that data for certain overlapping bits are discarded so that only data for a full line of 8640 pixels is input to buffer 610 for each line.

Data output from buffer 610 may be multiplexed by multiplexer 612 to RAM or other types of correction circuits 614, 616 where the 4-bits per pixel data is corrected for nonuniformity of the recording elements on printhead 700 in accordance with the techniques described in the aforementioned U.S. patent applications. Broadly, the techniques for correction of data, such as for nonuniformities of the recording elements, are well known and documented in the patent literature; and this is not essential to use of our invention.

The printhead 700 used, in this example, a gray level LED printhead that includes 8640 LEDs arranged in a row traversely across a moving light sensitive member such as a photoconductive recording member or film. The LEDs are spaced at a resolution of 1/600 inches and selectively enabled in accordance with the data to be recorded on the light sensitive member. To facilitate higher speeds of loading data on the printhead and thus provide for higher printing speeds, it is desirable and well known to simultaneously submit to the printhead image data for plural LEDs. In this example, data for 8 pixels is sent simultaneously to the printhead. Typically, it is desirable to send data for odd and even LEDs since driver chips for accepting this data and controlling disablement of the LEDs are located opposite sides of the row of LEDs. To further speed transmission of data to the printhead, four sets of data for even-numbered LEDs and four sets of data for odd-numbered LEDs may be simultaneously sent to the printhead. For example, data for LEDs numbered 1, 2161, 4321 and 6481 may be the odd data that is sent as a group to the printhead while data for LEDs numbered 2, 2162, 4322 and 6482 is an even group of data that is sent simultaneously with the odd group. The corrected data may transform each 4-bits per pixel signal representing 16 gray levels to a six bits per pixel pulse duration signal for controlling the on-time of current to a respective LED for recording the pixel. During a next clock period, data for odd LEDs numbered 3, 2163, 4323, 6483 and for even LEDs numbered 4, 2164, 4324 and 6484 are simultaneously sent to the printhead for loading in the data registers on the printhead. While data for one complete line of pixels is loaded on the printhead, data for a previous line may be printed.

If the incoming data is low resolution binary data, the printhead may be a higher resolution binary printhead for printing with LHRET. It is also possible to operate a gray level printhead in an essentially binary mode where the image data represents only a print or no print decision for each pixel but extra bits are associated with data for each pixel to correct for nonuniformity of the recording elements. Of course, the invention is not limited to recording with LEDs and a laser printer may also be used to record. In addition, the invention finds applicability in electronic printers in general including inkjet, thermal and electrographic recording and in displays.

TABLE 2

| MODES | Address in 238 | Address OUT 238 | DATA STORED FOR THE OUTPUT LUT 300 EXTERNAL TO THE CHIP 200 |
|---|---|---|---|
| Regular GRET in bypass mode | 0 . . . 15 | 0 . . . 15 | direct map of the 4-bits data from 0–15 |
| Regular GRET | 0 . . . 24 | 16 . . . 40 | 4-bits gray level data based on print engine TRC |
|  |  | 41 . . . 46 47 | not used assigned 0 |
| LHGRET Bypass mode | 0, 15 | 0, 15 | direct map of 0, 15 to 4 output pixel binary data |
| LHGRET | 0 . . . 15 | 48 . . . 63 | 4 output pixels binary data based on print engine TRC |

TABLE 3

| GRET Input Pixels | GRET Chip # | Unenhanced Pixels | Enhanced Pixels | Unenhanced Pixels | Actual Pixel Used for Output |
|---|---|---|---|---|---|
| 1 ... 2168 | A | 1 ... 4 | 5 ... 2164 | 2165 ... 2168 | 1 ... 2160 |
| 2157 ... 4324 | B | 2157 ... 2160 | 2161 ... 4320 | 4321 ... 4324 | 2161 ... 4320 |
| 4317 ... 6484 | C | 4317 ... 4320 | 4321 ... 6480 | 6481 ... 6484 | 4321 ... 6480 |
| 6473 ... 8640 | D | 6473 ... 6476 | 6477 ... 8636 | 8637 ... 8640 | 6481 ... 8640 |

The above described edge enhancement system provides many advantages over conventional systems. For example, it is not necessary to provide a set of criteria for comparison with every possible bit map pattern, instead, the bit map patterns can be rotated to form a template that can be compared to a set of criteria for analyzing the template. A reduction in the set of criteria is thereby provided, and there is no need to store a multitude of templates for which an exact match is done as in conventional template matching methods. In addition, the edge enhancement system reduces line jaggedness with little sharpness degradation, in contrast to conventional outline extraction methods in which the outline of the text is traced by linking the maximum gradient magnitude points together. The outline extraction method runs into problems when the fonts in the image to be printed become smaller or when there are multiple single pixel line segments that are closely spaced. A further advantage is that gray level data is left untouched and just binary data is enhanced, enabling the system to be employed with MAP devices. Finally, the system can be used to provide enhancement in cases where the input file is a low resolution file and the output of the system is provided to a printer having a higher resolution than the input file.

The invention has been described with reference to certain preferred embodiments thereof. It will be understood, however, that modifications and variations can be made within the scope of the appended claims.

INDUSTRIAL UTILITY

The invention can be utilized to process any low resolution binary image file for printing on various types of gray-scale printers including those employing lasers, LEDs, thermal, ink-jet or other non-impact printing elements or for use on a gray-scale display such as a CRT, etc. The invention can also be used to print using higher resolution non-impact binary printers or for use with binary displays.

What is claimed is:

1. An image data processing apparatus for generating enhanced image data, the apparatus comprising:
   means for providing first binary image data of a plurality of pixel locations, the image data being of a first pixel resolution;
   means for separating a line of the image data into segments for processing in plural respective channels;
   means in each channel for determining a gradient magnitude corresponding to each pixel location of the first binary of image data to be processed by the respective channel;
   means in each channel for determining a gradient direction corresponding to each pixel location of the first binary image data to be processed by the respective channel;
   a decision matrix means in each channel for comparing a window of pixel locations of the first binary image data and the gradient magnitudes and directions corresponding thereto to a predetermined set of criteria and in response generating an output signal resulting from the comparison; and
   means responsive to the signal for generating respective enhanced image data, representing second binary image data of a second pixel resolution that is higher than said first resolution in response to the respective output signal of the decision matrix means.

2. The apparatus of claim 1, wherein the output signal of the decision matrix means is a look-up table address and the means for generating the second binary image data includes a look-up table.

3. The apparatus of claim 1, including means for rotating the window to a predetermined reference direction in response to the gradient direction information corresponding thereto.

4. The apparatus of claim 1, wherein the decision matrix means determines whether a current pixel of the window is a black or white pixel, whether the central pixel is located in a single pixel width line, and the location of the central pixel with respect to a kink site.

5. The apparatus of claim 4 including mode designating means for generating a mode designating signal representing alternatively a first operational mode wherein said system provides grey level enhancement at the first pixel resolution and a second operational mode wherein said system provides binary image enhancement at the second pixel resolution;
   second decision matrix means for comparing a window of pixel locations of the first binary image data and gradient magnitudes and directions corresponding thereto to a predetermined set of criteria and generating an output signal indicative of the comparison; and
   means responsive to said mode designating signal for generating enhanced grey-scale image data of said first pixel resolution in response to the output signal of the second decision matrix means.

6. The apparatus of claim 4 and wherein the decision matrix means simultaneously determines whether a current pixel of the window is a black or white pixel, whether the current pixel is located in a single pixel width line and a location of the current pixel with respect to a kink site.

7. The apparatus of claim 6 and wherein the decision matrix means includes means for biasing determinations of locations of the current pixel with respect to a kink site towards a position more proximate to a kink site.

8. The apparatus of claim 7 and wherein the decision matrix means includes a memory and logic means providing addresses to the memory wherein the logic means provides simultaneous determinations of locations of the current pixel with respect to a kink site.

9. The apparatus of claim 6 and wherein the decision matrix means includes means for biasing determinations of locations of the current pixel with respect to a kink site towards a position more proximate to an end of a line.

10. The apparatus of claim 9 and wherein the decision matrix means includes a memory and logic means providing addresses to the memory wherein the logic means provides simultaneous determinations of locations of the current pixel with respect to an end of a line.

11. The apparatus of claim 1 including mode designating means for generating a mode designating signal representing alternatively a first operational mode wherein said system provides grey level enhancement at the first pixel resolution and a second operational mode wherein said system provides binary image enhancement at the second pixel resolution;

second decision matrix means for comparing a window of pixel locations of the first binary image data and gradient magnitudes and directions corresponding thereto to a predetermined set of criteria and generating an output signal indicative of the comparison; and means responsive to said mode designating signal for generating enhanced grey-scale image data of said first pixel resolution in response to the output signal of the second decision matrix means.

12. The apparatus of claim 1 and including network means for receiving inputs from plural sources including a raster image processor and a digital scanner.

13. An image data processing apparatus for generating enhanced image data, the apparatus comprising:

means for providing a line of data representing pixels in segments for processing in each of respective plural channels, a decision matrix means in each of said respective channels for comparing a respective window of pixel locations to a predetermined set of criteria including gradient values corresponding to the image data and generating a respective output signal indicative of the comparison; and means for generating respective enhanced image data in response to the respective output signal of the decision matrix means of the respective channel.

14. An image data processing apparatus for generating enhanced image data, the apparatus comprising:

decision matrix means for comparing a window of pixel data including gradient values corresponding to the image data to a predetermined set of criteria and generating a respective output signal indicative of the comparison, the decision matrix means including means operating to determine plural criteria simultaneously with the output signal determined in accordance with a bias towards a determination of a finding of closer proximity towards a site likely to require image enhancement.

15. The image data processing apparatus of claim 14, and further comprising:

means for providing first binary image data of a plurality of pixel locations, the image data being of a first pixel resolution;

means for determining a gradient magnitude corresponding to each pixel location of the first binary image data;

means for determining a gradient direction corresponding to each pixel location of the first binary image data;

the decision matrix means comparing a window of pixel locations of the first binary image data and the gradient magnitudes and directions corresponding thereto to a predetermined set of criteria and generating an output signal indicative of the comparison; and means for generating second binary image data of a second pixel resolution that is higher than said first resolution in response to the output signal of the decision matrix means.

16. The apparatus of claim 15, wherein the output signal of the decision matrix means is a look-up table address and the means for generating the second binary image data includes a look-up table.

17. The apparatus of claim 15, including means for rotating the window to a predetermined reference direction in response to the gradient direction information corresponding thereto.

18. The apparatus of claim 15, wherein the decision matrix means determines whether a current pixel of the window is a black or white pixel, whether the central pixel is located in a single pixel width line, and the location of the central pixel with respect to a kink site.

19. The apparatus of claim 18 including mode designating means for generating a mode designating signal representing alternatively a first operational mode wherein said system provides grey level enhancement at the first pixel resolution and a second operational mode wherein said system provides binary image enhancement at the second pixel resolution;

second decision matrix means for comparing a window of pixel locations, of the first binary image data and gradient magnitudes and directions corresponding thereto to a predetermined set of criteria and generating an output signal indicative of the comparison; and means responsive to said mode designating signal for generating enhanced grey-scale image data of said first pixel resolution in response to the output signal of the second decision matrix means.

20. The apparatus of claim 18 and wherein the decision matrix means simultaneously determines whether a current pixel of the window is a black or white pixel, whether the current pixel is located in a single pixel width line and a location of the current pixel with respect to a kink site.

21. The apparatus of claim 20 and wherein the decision matrix means includes means for biasing determinations of locations of the current pixel with respect to a kink site towards a position more proximate to a kink site.

22. The apparatus of claim 21 and wherein the decision matrix means includes a memory and logic means providing addresses to the memory wherein the logic means provides simultaneous determinations of locations of the current pixel with respect to a kink site.

23. The apparatus of claim 20 and wherein the decision matrix means includes means for biasing determinations of locations of the current pixel with respect to a kink site towards a position more proximate to an end of a line.

24. The apparatus of claim 23 and wherein the decision matrix means includes a memory and logic means providing addresses to the memory wherein the logic means provides simultaneous determinations of locations of the current pixel with respect to an end of a line.

25. The apparatus of claim 15 including mode designating means for generating a mode designating signal representing alternatively a first operational mode wherein said system provides grey level enhancement at the first pixel resolution and a second operational mode wherein said system provides binary image enchancement at the second pixel resolution;

second decision matrix means for comparing a window of pixel locations of the first binary image data and gradient magnitudes and directions corresponding thereto to a predetermined set of criteria and generating an output signal indicative of the comparison; and means responsive to said mode designating signal for generating enhanced grey-scale image data of said first pixel resolution in response to the output signal of the second decision matrix means.

26. The apparatus of claim 14 and including network means for receiving inputs from plural sources including a raster image processor and a digital scanner.

27. An image data processing apparatus comprising:
   means for providing a line of pixels in line segments for processing in plural channels;
   means in each of said channels for comparing a window of pixel data of an image including first binary image data of a first pixel resolution and gradient values corresponding to the image data to a predetermined set of criteria and generating a signal indicative of the comparison; and
   means for generating second binary image data of a second pixel resolution that is higher than said first resolution in response to the signal.

28. The apparatus of claim 27 including mode designating means for generating a mode designating signal representing alternatively a first operational mode wherein said system provides grey level enhancement at the first pixel resolution and a second operational mode wherein said system provides binary image enhancement at the second pixel resolution; and
   means responsive to said mode designating signal for generating enhanced grey-scale image data of said first pixel resolution in response to a mode designating signal representing a first operational mode.

29. The apparatus of claim 28 and including network means for receiving inputs from plural sources including a raster image processor and a digital scanner.

30. The apparatus of claim 27 and including network means for receiving inputs from plural sources including a raster image processor and a digital scanner.

31. An image data processing apparatus comprising:
   means for comparing a window of pixel data of an image including first binary image data of a first pixel resolution and gradient values corresponding to the image data to a predetermined set of criteria and generating a signal indicative of the comparison and wherein the comparing means includes a decision matrix means for comparing the window of pixel data to the predetermined set of criteria and generating the respective signal indicative of the comparison, the decision matrix means including means operating to determine plural criteria simultaneously with the signal determined in accordance with a bias towards a determination of a finding of closer proximity towards a site likely to require image enhancement; and
   means for generating second binary image data of a second pixel resolution that is higher than said first resolution in response to the signal.

32. An image data processing apparatus for generating enhanced image data, the apparatus comprising:
   means for providing image data representing a full raster line of pixels in respective line segments for processing in each of plural respective channels;
   a decision matrix means in each of said channels for comparing a respective window of pixel data to a predetermined set of criteria and generating a respective output signal indicative of the comparison;
   means for generating respective enhanced image data for a pixel in each respective line segment in response to the respective output signal of the respective decision matrix means; and
   wherein each decision matrix means includes means operating to determine plural criteria simultaneously with a respective output signal determined in accordance with a bias towards a determination of a finding of closer proximity towards a site likely to require image enhancement.

33. An image data processing apparatus for generating enhanced image data, the apparatus comprising:
   means for providing a line of data representing pixels in segments for processing in each of respective plural channels;
   a decision matrix means in each of said respective channels for comparing a respective window of pixel locations to a predetermined set of criteria and generating a respective output signal indicative of the comparison; and
   means for generating respective enhanced image data in response to the respective output signal of the decision matrix means of the respective channel;
   and wherein said means for generating respective enhanced image data is operational in first and second operational modes wherein said system provides grey level enhancement at a first resolution in said first operational mode and said system provides binary image enhancement at a second pixel resolution higher than said first resolution.

34. An image data processing method for generating enhanced image data, the method comprising:
   providing a full raster line of pixels in respective line segments for processing in plural respective channels;
   in each of said channels, comparing a respective window of pixel data to a predetermined set of criteria and generating a respective output signal indicative of the comparison, in the step of comparing operating to determine plural criteria simultaneously with the output signal determined in accordance with a bias towards a determination of a finding of closer proximity towards a site likely to require image enhancement; and
   generating respective enhanced image data for a pixel in a respective line segment in response to the respective output signal.

35. An image data processing method for generating enhanced image data comprising:
   providing pixel data;
   comparing a window of the pixel data to a predetermined set of criteria and generating a respective output signal indicative of the comparison, in the step of comparing operating to determine plural criteria simultaneously with the output signal determined in accordance with a bias towards a determination of a finding of closer proximity towards a site likely to require image enhancement and also in the step of comparing the window of the pixel data of an image including first binary image data of a first pixel resolution and gradient values corresponding to the image data are compared to the predetermined set of criteria; and
   generating second binary image data of a second pixel resolution that is higher than said first resolution in response to the signal.

36. The method of claim 35 including generating a mode designating signal representing alternatively a first operational mode wherein there is provided grey level enhancement at the first pixel resolution and a second operational mode wherein there is provided binary image enhancement at the second pixel resolution; and
   in response to said mode designating signal, generating enhanced grey-scale image data of said first pixel resolution in response to a mode designating signal representing a first operational mode.

37. The method of claim 36 and including receiving inputs of pixel data from plural sources including a raster image processor and a digital scanner.

38. The method of claim 35 and including receiving inputs of pixel data from plural sources including a raster image processor and a digital scanner.

39. The method of claim 35 including providing a raster line of pixels in respective line segments for processing in plural respective channels; in each of said channels comparing a respective window of pixel data to a predetermined set of criteria and generating a respective output signal indicative of the comparison; and generating respective second binary image data of said second resolution in response to the respective signal.

40. An image data processing method for generating enhanced image data, the method comprising:

providing a line of pixel data in respective line segments for processing in plural respective channels;

comparing in each of said channels a respective window of pixel data to a predetermined set of criteria including gradient values corresponding to the image data and generating a respective output signal indicative of the comparison;

generating in each of said channels respective enhanced image data in response to the respective output signal; and wherein in the step of comparing operating to determine plural criteria simultaneously with a respective output signal determined in accordance with a bias towards a determination of a finding of closer proximity towards a site likely to require image enhancement.

* * * * *